(12) United States Patent
Lankford et al.

(10) Patent No.: US 9,983,666 B2
(45) Date of Patent: May 29, 2018

(54) SYSTEMS AND METHOD OF PROVIDING AUTOMATIC MOTION-TOLERANT CALIBRATION FOR AN EYE TRACKING DEVICE

(71) Applicant: DYNAVOX SYSTEMS LLC, Pittsburgh, PA (US)

(72) Inventors: Chris Lankford, Pittsburgh, PA (US); Timothy Mulholland, II, Pittsburgh, PA (US); Charles McKinley, Pittsburgh, PA (US)

(*) Notice: Subject to any disclaimer, the term of this patent is extended or adjusted under 35 U.S.C. 154(b) by 0 days. days.

(21) Appl. No.: 14/790,206

(22) Filed: Jul. 2, 2015

(65) Prior Publication Data

US 2015/0301600 A1  Oct. 22, 2015

Related U.S. Application Data

(62) Division of application No. 13/263,816, filed as application No. PCT/US2010/030489 on Apr. 9, 2010, now abandoned.

(Continued)

(51) Int. Cl.
*G09G 5/00* (2006.01)
*G06F 3/01* (2006.01)
(Continued)

(52) U.S. Cl.
CPC .............. *G06F 3/013* (2013.01); *G06F 3/005* (2013.01); *G06F 3/0481* (2013.01);
(Continued)

(58) Field of Classification Search
CPC ........ G06K 9/20; G06K 9/00; G06K 9/00604; G06K 9/2027; G06F 3/01; G06F 3/0481;
(Continued)

(56) References Cited

U.S. PATENT DOCUMENTS 4,973,149 A   11/1990  Hutchinson
5,345,281 A    9/1994  Taboada et al.
(Continued)

OTHER PUBLICATIONS

International Search Report for PCT/US 10/30489, dated Aug. 4, 2010.
(Continued)

*Primary Examiner* — Gregory J Tryder
*Assistant Examiner* — Michael Le
(74) *Attorney, Agent, or Firm* — Dority & Manning, P.A.

(57) ABSTRACT

Eye tracking systems and methods include such exemplary features as a display device, at least one image capture device and a processing device. The display device displays a user interface including one or more interface elements to a user. The at least one image capture device detects a user's gaze location relative to the display device. The processing device electronically analyzes the location of user elements within the user interface relative to the user's gaze location and dynamically determine whether to initiate the display of a zoom window. The dynamic determination of whether to initiate display of the zoom window may further include analysis of the number, size and density of user elements within the user interface relative to the user's gaze location, the application type associated with the user interface or at the user's gaze location, and/or the structure of eye movements relative to the user interface.

12 Claims, 10 Drawing Sheets

Related U.S. Application Data

(60) Provisional application No. 61/168,124, filed on Apr. 9, 2009.

(51) Int. Cl.

| | | |
|---|---|---|
| *G06F 3/0481* | (2013.01) | |
| *G06K 9/00* | (2006.01) | |
| *G06K 9/20* | (2006.01) | |
| *G06F 3/00* | (2006.01) | |
| *G06F 3/0484* | (2013.01) | |

(52) U.S. Cl.
CPC ..... *G06F 3/04842* (2013.01); *G06K 9/00604* (2013.01); *G06K 9/2027* (2013.01); *G06F 2203/04805* (2013.01); *G06F 2203/04806* (2013.01)

(58) Field of Classification Search
CPC ...... G06F 3/005; G06F 3/013; G06F 3/04842; G06F 2203/04805; G06F 2203/04806
USPC .................................................. 345/660, 661
See application file for complete search history.

(56) References Cited

U.S. PATENT DOCUMENTS

| | | | |
|---|---|---|---|
| 5,644,642 A | | 7/1997 | Kirschbaum |
| 6,152,563 A * | | 11/2000 | Hutchinson ............ A61B 3/113 351/209 |
| 6,633,655 B1 | | 10/2003 | Hong et al. |
| 6,758,563 B2 * | | 7/2004 | Levola .................. A61B 3/113 351/209 |
| 6,873,714 B2 | | 3/2005 | Witt et al. |
| 7,091,471 B2 | | 8/2006 | Wensttrand et al. |
| 7,522,344 B1 | | 4/2009 | Curatu et al. |
| 7,809,171 B2 | | 10/2010 | Solinsky et al. |
| 8,066,375 B2 | | 11/2011 | Skogö et al. |
| 2003/0137522 A1 | | 7/2003 | Kaasila et al. |
| 2004/0005083 A1 | | 1/2004 | Fujimura et al. |
| 2004/0101170 A1 | | 5/2004 | Tisse et al. |
| 2004/0174496 A1 * | | 9/2004 | Ji ............................ G06F 3/013 351/209 |
| 2004/0196433 A1 * | | 10/2004 | Durnell .............. G06K 9/00604 351/209 |
| 2005/0005240 A1 | | 1/2005 | Reynar et al. |
| 2005/0225723 A1 | | 10/2005 | Pilu |
| 2005/0234722 A1 | | 10/2005 | Robinson et al. |
| 2006/0002625 A1 | | 1/2006 | Haven et al. |
| 2006/0093998 A1 | | 5/2006 | Vertegaal |
| 2006/0156228 A1 | | 7/2006 | Gallo et al. |
| 2006/0209043 A1 | | 9/2006 | Cohen et al. |
| 2006/0238707 A1 | | 10/2006 | Elvesjo et al. |
| 2007/0011609 A1 | | 1/2007 | Adjouadi et al. |
| 2007/0040908 A1 | | 2/2007 | Cleveland et al. |
| 2007/0164990 A1 | | 7/2007 | Bjorklund et al. |
| 2008/0049185 A1 * | | 2/2008 | Huffman ................ A61B 3/113 351/206 |
| 2008/0231805 A1 | | 9/2008 | Schwerdtner |
| 2009/0146775 A1 * | | 6/2009 | Bonnaud .............. G06F 9/4446 340/3.1 |
| 2010/0328444 A1 | | 12/2010 | Blixt et al. |

OTHER PUBLICATIONS

Joseph H. Goldberg, Jack C. Schryver, "Eye-gaze-contingent control of the computer interface: Methodology and example for zoom detection", Sep. 1995, vol. 27, Issue 3, pp. 338-350, Behavior Research Methods, Instruments & Computers.

* cited by examiner

SYSTEMS AND METHOD OF PROVIDING AUTOMATIC MOTION-TOLERANT CALIBRATION FOR AN EYE TRACKING DEVICE

PRIORITY CLAIM

The present application is a divisional of U.S. patent application Ser. No. 13/263,816 filed Oct. 10, 2011, which was nationalized under 35 U.S.C. § 371 from international application No. PCT/US2010/030489 filed on Apr. 9, 2010, which claims the benefit under 35 U.S.C. § 119(e) of previously filed U.S. Provisional Patent Application No. 61/168,124, filed Apr. 9, 2009. Applicants claim priority to and benefit of all such applications and incorporate all such applications herein by reference for all purpose.

FIELD OF THE INVENTION

The present invention generally pertains to electronic interface technologies, and more particularly to systems and methods that employ eye tracking as a user interface to an electronic device.

BACKGROUND OF THE INVENTION

When someone suffers a tragic accident or is inflicted with a terrible disease, the ability to effectively communicate or access a computer is frequently lost, especially when the accident or disease causes paralysis or induces, in the opposite extreme, involuntary motion of the body. In either scenario, eye movements are often the only aspect of a person's body that the person can control. As such, users may seek to employ alternative and augmentative communications (AAC) technologies. Some forms of alternative access technologies include eye-tracking systems, head pointing mice, voice activated systems, or scanning technology.

Some alternative access technologies are characterized by certain limitations. For example, scanning technology may sometimes be inefficient because it is not a direct selection technology. Scanning typically works by successively highlighting rows of buttons and then having the user actuate a switch to choose the row for which he/she wishes to push a button. Each button is then highlighted and clicking the switch again selects the button. Voice activated systems are only generally available to people with disabilities who can speak. Head pointing mice only work for those that have good head control, so individuals with paralysis or involuntary motion cannot use it.

In light of the above limitations, eye-tracking technology has emerged as an attractive option for users to interface with electronic devices, such as but not limited to computers, speech generation devices, and other electronic technologies. One example of an eye-tracking access method is disclosed in U.S. Pat. No. 6,152,563 to Hutchinson et al. Such patent generally describes an eye-gaze direction detection system and method that can be used to help detect eye movement or determine eye-gaze direction (i.e., a user's point of regard).

The Hutchinson et al. '563 patent is a robust system, but may be characterized by certain limitations. For example, the eye-tracking technology in the Hutchinson et al. '563 patent requires a fixed head position and/or a user initiated calibration procedure. As such, users with involuntary motion frequently cannot benefit from the technology.

In addition, the zooming technique disclosed in the Hutchinson et al. '563 patent requires zooming to be either on or off. This feature limits the adaptability of the zooming features and requires time and effort on the part of a user who may want to toggle between the different available zooming modes.

Still further, additional features may be desired to enhance the selection system afforded by the technology in the Hutchinson et al. '563 patent, including selection features associated with the user's context, type of feedback mechanism (e.g., pointer) showing where the user is looking, the amount of zooming, size of the focus region, etc.

In light of the various design concerns in the field of eye gaze technologies, a need continues to exist for refinements and improvements to address the above concerns and others. While various implementations of eye gaze technologies and associated features and steps have been developed, no design has emerged that is known to generally encompass all of the desired characteristics hereafter presented in accordance with aspects of the subject technology.

BRIEF SUMMARY OF THE INVENTION

In view of the recognized features encountered in the prior art and addressed by the present subject matter, improved eye tracking systems and methods have been developed. In various embodiments, eye tracking improvements include one or more features related to zooming/selection, visual feedback display, text entry, word prediction, calibration, and image capture.

In one exemplary embodiment of the present technology, an eye gaze detection system, includes a display device, at least one image capture device and a processing device. The display device is configured to display a user interface to a user, wherein the user interface includes one or more interface elements. The at least one image capture device is configured to detect a user's gaze location relative to the display device. The processing device is configured to electronically analyze the location of user elements within the user interface relative to the user's gaze location and dynamically determine whether to initiate the display of a zoom window.

Another exemplary embodiment of the present technology concerns a method for automatically initiating user interface magnification within an electronic device. In accordance with such an exemplary method, the presence of one or more interface elements are electronically detecting in a user interface relative a user's gaze point on the user interface. The density of interface elements around the user's gaze point is electronically determined. The display of a zoom window (e.g., a magnified view of a portion of the user interface) is automatically initiated if the electronically determined density of interface elements exceeds a predetermined density threshold level.

In another exemplary embodiment of the present technology, an eye gaze detection system includes a display device, at least one image capture device and a processing device. The display device is configured to display a user interface to a user, wherein the interface comprises one or more interface elements. The at least one image capture device is for detecting a user's gaze location relative to the display device. The processing device is configured to detect user interface elements within the user interface relative to the user's gaze location and dynamically determine whether to initiate the display of one or more visual feedback elements on the user interface at or near the user's gaze location, wherein such dynamic determination is made based on whether the user's gaze location is at or within a predetermined distance of an interface element.

Another exemplary embodiment of the disclosed technology concerns a method for displaying and updating visual feedback elements in an eye tracking system. One step in such method involves electronically detecting a user's gaze location corresponding to where a user is looking relative to a user interface. Another step involves electronically determining whether any reactable interface elements are pointed at or within a predetermined distance from the user's gaze location. A still further step involves electronically displaying one or more visual feedback elements on the user interface at or near the user's gaze location if one or more reactable interface elements are found at or within a predetermined distance from the user's gaze location.

In yet another exemplary embodiment of the disclosed technology, an electronic device with text entry features includes a display device and a processing device. The display device is configured to electronically display a user interface to a user. The processing device is configured to analyze aspects of the user interface to electronically determine when text entry needs to occur within a control element in the user interface. The processing device is further configured upon determination that text entry needs to occur within the user interface to display a selectable interface element to a user that upon selection invokes an on-screen keyboard with text entry area. The processing device is further configured to relay input received from a user via the on-screen keyboard to the control element in the user interface requiring text entry.

Yet another exemplary embodiment of the disclosed technology concerns a method of providing input features for a computing system. A first step involves electronically determining when text entry needs to occur within a control element in a user interface. Another step involves electronically presenting a selectable interface element to a user that upon selection invokes an on-screen keyboard having a text entry area. A still further step involves receiving electronic input from a user via eye-controlled selection of buttons provided via the on-screen keyboard. A final step concerns electronically relaying the input received from a user via the on-screen keyboard to the control element in the user interface requiring text entry.

In a further embodiment of the disclosed technology, an electronic device with adaptable interface features includes a display device and a processing device. The display device is configured to electronically display a user interface to a user. The user interface comprises a message composition window and a plurality of selectable buttons having respective content items. The processing device is configured to determine message content provided in said message composition window and to change the content items and associated commands for selected ones of the selectable buttons based on the message content provided in said message composition window.

Another exemplary embodiment of the disclosed technology concerns a method of implementing word prediction features for a graphical user interface. In such exemplary method, a user interface is electronically displayed to a user. The user interface comprises a message composition window and a plurality of selectable buttons having respective content items. A detection is made regarding the message content provided in the message composition window. Finally, the content items and corresponding commands associated with selected ones of the selectable buttons are altered based on the message content provided within the message composition window.

Yet another exemplary embodiment of the present technology concerns a method of providing automatic motion-tolerant calibration for an eye tracking device. Such an auto-calibration method may involve obtaining an initial set of eye images and at least one subsequent set of eye images. A scaling factor is determined for each subsequent set of images. The scaling factor is defined by spatial differences between eye features in each subsequent set of images and the initial set of eye images or another previously obtained set of eye images. Glint and pupil information is obtained from selected sets of images. A final step involves applying the glint and pupil information from selected sets of images and the appropriate scaling factor for the selected sets of images to a calibration model to determine a sequence of equations for mapping future gaze locations.

Another exemplary embodiment of the present technology relates to an eye tracking device. The eye tracking device may include at least first and second image capture devices configured to obtain sets of images of a user's eyes. The eye tracking device may also include at least one light source configured to selectively illuminate the eyes of a user of the eye tracking device. The eye tracking device may still further include a processing device configured to coordinate the timing of illumination provided by the at least one light source and images captured by the at least first and second image capture devices such that respective sets of images are obtained. Each set of images comprises at least one image from the first image capture device and at least one image from the second image capture device. The processing device is also configured to analyze selected images obtained from the at least first and second image capture devices to determine a scaling factor representing the spatial changes of a user's eye position in space between a current eye position and a previous eye position.

Another exemplary embodiment of the presently disclosed technology concerns a method of optimizing the image capture mode for an eye tracking device. In accordance with such a method, at least one bright-eye image and at least one dark-eye image of one or more eyes of a user are obtained. One or more data parameters associated with the at least one bright-eye image and the at least one dark-eye image are then gathered to determine an image score associated with the at least one bright-eye image and an image score associated with the at least one dark-eye image. A best mode of image capture is designated based on the determined image score associated with the at least one bright-eye image and the at least one dark-eye image. The eye tracking device is then configured to obtain future images in the designated best mode of image capture.

A still further exemplary embodiment of the present technology relates to an eye tracking device including at least first and second image capture devices, at least one light source, and a processing device. The at least first and second image capture devices are configured to obtain sets of images of a user's eyes. The at least one light source is configured to selectively illuminate the eyes of a user of the eye tracking device. The processing device is configured to coordinate the timing of illumination provided by the at least one light source and images captured by the at least first and second image capture devices such that at least one bright-eye image is obtained and at least one dark-eye image is obtained. The processing device is further configured to analyze the at least one bright-eye image and the at least one dark-eye image to determine respective image scores associated with the at least one bright-eye image and the at least one dark-eye image and to designate a best mode of image capture for future images based on the determined respective image scores.

Additional aspects and advantages of the present subject matter are set forth in, or will be apparent to, those of ordinary skill in the art from the detailed description herein or from practice of the invention. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

DETAILED DESCRIPTION OF THE PREFERRED EMBODIMENTS

Figure 1:
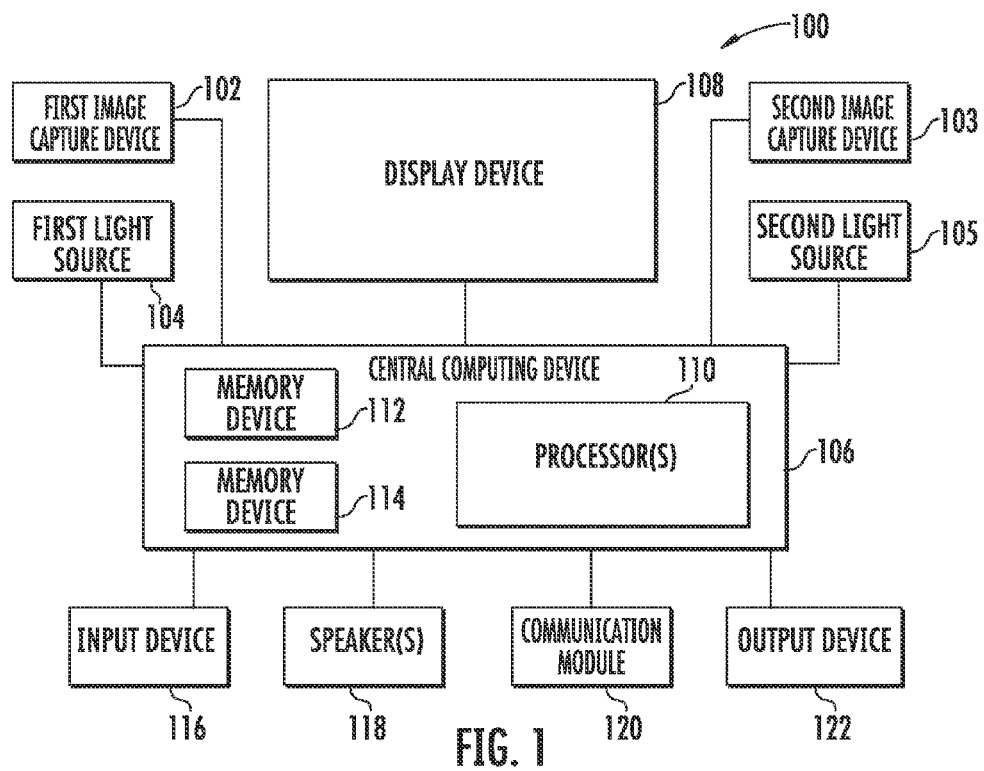
FIG. 1 provides a schematic diagram of exemplary hardware components for use within an eye gaze detector in accordance with an aspect of the present invention.

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Hardware:

The various features and aspects of the presently disclosed technology generally relate to improvements in the field of eye gaze technology. As such, it should be appreciated that such features and aspects can be employed in any number of systems and methods that utilize some form of eye gaze detection technology, including but not limited to systems and/or methods that detect eye movement or that determine eye gaze direction (i.e., eye tracking or eye tracker systems).

Known examples of eye tracking systems and methods are known, many of which can be employed in accordance with one or more aspects of the presently disclosed technology. Examples of eye tracker devices are disclosed in U.S. Pat. No. 3,712,716 to Cornsweet et al.; U.S. Pat. No. 4,950,069 to Hutchinson; U.S. Pat. No. 5,589,619 to Smyth; U.S. Pat. No. 5,818,954 to Tomono et al.; U.S. Pat. No. 5,861,940 to Robinson et al.; U.S. Pat. No. 6,079,828 to Bullwinkel; and U.S. Pat. No. 6,152,563 to Hutchinson et al.; each of which is hereby incorporated herein by this reference for all purposes. Examples of suitable eye tracker devices also are disclosed in U.S. Patent Application Publication Nos.: 2006/0238707 to Elvesjo et al.; 2007/0164990 to Bjorklund et al.; and 2008/0284980 to Skogo et al.; each of which is hereby incorporated herein by this reference for all purposes.

Eye tracking applications may be especially useful for interfacing with computer based systems and other electronic devices, such as but not limited to desktop computers, laptop computers, tablet computers, cellular phones, mobile devices, media players, personal digital assistant (PDA) devices, speech generation devices or other AAC devices and the like. Such devices or others incorporating the disclosed eye gaze features could also prove beneficial in particular areas, including psychological research, marketing research, gaming, or medical diagnostics. Such features could also be used to measure where people look in cockpits, while driving, while performing surgery, in arcade games, on television screens, movie screens, or any other environment where measuring a person's direction of gaze can provide additional value.

An electronic device employing various features and aspects of the presently disclosed technology may generally include one or more hardware components, an exemplary combination of which is depicted in FIG. 1. In general, an eye gaze detector may include such basic hardware elements as one or more image capture devices, one or more light sources and some computing and/or processing device that function together to detect and analyze light reflected from the user's eyes. In some embodiments, the image capture, light source and computing devices are provided as a stand-alone eye tracking assembly. In other embodiments, a display device is also provided such that a user's eye gaze can be tracked relative to the user's point of regard on the display surface. In such instances, the image capture and light source devices may be integrated with the display device in a modular assembly or may be provided as separate interfaced components. Still further components may be integrated or attached, such as various input, output and communication devices.

Referring more particularly to the embodiment shown in FIG. 1, an exemplary eye gaze detection system (i.e., eye tracker) 100 includes a first image capture device 102, a first light source 104 and a central computing device 106. In some embodiments, the eye gaze detection system also includes a second image capture device 103 and second light source 105 as well as a display device 108. As will be appreciated from later description herein, the provision of two image capture devices may facilitate such features as automated calibration for a user of an eye tracking system. In still further embodiments, a plurality of light sources and/or image capture devices (more than one or two) may also be employed. First and/or second image capture devices 102, 103 may include any number of devices suitable for capturing an image of a user's eyes. Nonlimiting examples of suitable image capture devices include cameras, video cameras, sensors (e.g., photodiodes, photodetectors, CMOS sensors and/or CCD sensors) or other devices.

Respective first and/or second light sources 104, 105 may include any number of light sources suitable for illuminating a user's eye(s) so that the image capture devices 102, 103 can measure certain identifiable features associated with the illuminated eyes. In some arrangements, a light source is positioned as close as possible to the center of a corresponding image capture device. Such arrangement may be better for capturing a bright pupil or bright-eye effect upon illumination of a user's eye. In other arrangements, a light source is positioned distant from the center of a corresponding image capture device, which may be useful for capturing a dark pupil or dark-eye effect.

In one example, light sources 104 and/or 105 may respectively include one or more light emitting diodes (LEDs). The LEDs may be arranged singularly or in some sort of arrayed combination, such as in a staggered, linear, circular or other patterned combination of lights. The LEDs may emit infrared or near infrared light having a wavelength of between about 750-1500 nanometers. In one particular example, the LEDs emit light having a wavelength of about 880 nanometers, which is the shortest wavelength deemed suitable in one exemplary embodiment for use without distracting the user (the shorter the wavelength, the more sensitive the sensor, i.e., video camera, of the eye tracker). However, LEDs operating at wavelengths other than about 880 nanometers easily can be substituted and may be desirable for certain users and/or certain environments.

Display device 108 may correspond to one or more substrates outfitted for providing images to a user. In many cases, the user's point of regard will be determined by analyzing where the user is looking relative to the surface of display device 108. Display device 108 may employ one or more of liquid crystal display (LCD) technology, light emitting polymer display (LPD) technology, light emitting diode (LED), organic light emitting diode (OLED) and/or transparent organic light emitting diode (TOLED) or some other display technology. In one exemplary embodiment, a display device includes an integrated touch screen to provide a touch-sensitive display that implements one or more of the above-referenced display technologies (e.g., LCD, LPD, LED, OLED, TOLED, etc.) or others. The touch sensitive display can be sensitive to haptic and/or tactile contact with a user (e.g., a capacitive touch screen, resistive touch screen, pressure-sensitive touch screen, etc.).

Processing functionality for the eye gaze detector may be provided by one or more processors, for example processor(s) 110 that are provided as part of central computing device 106. The computing device 106 may be provided as an integrated part of the eye detector 100 or as a separate peripheral component connected to other eye tracking components via an associated data port. In general, the computing device 106 receives images from the first and/or second image capture devices 102, 103 and applies various image processing algorithms thereto to detect and track a user's eyes. Usually, a mapping function—usually a second order polynomial function—is employed to map gaze measurements from the two-dimensional image space to the two-dimensional coordinate space of the display device 108.

In one particular example, computing device 106 can be provided to function as the central controller within the eye detector 100 and may generally include such components as at least one memory/media element or database for storing data and software instructions as well as at least one processor. As shown in FIG. 1, the one or more processor(s) 110 and associated memory/media devices 112 and 114 are configured to perform a variety of computer-implemented functions (i.e., software-based data services). The one or more processor(s) 110 within computing device 106 may be configured for operation with any predetermined operating system(s), such as but not limited to MICROSOFT WINDOWS (NT, XP, VISTA, 7, ETC.), and thus is an open system that is capable of running any application that can be run on Windows or other applicable OS. Other possible operating systems include BSD UNIX, Darwin (Mac OS X including specific implementations such as but not limited to "Cheetah," "Leopard," and "Snow Leopard" versions), Linux and SunOS (Solaris/OpenSolaris).

At least one memory/media device (e.g., device 112 in FIG. 1) is dedicated to storing software and/or firmware in the form of computer-readable and executable instructions that will be implemented by the one or more processor(s) 110. The same or other coupled memory/media devices (e.g., device 114 in FIG. 1) are used to store input and/or output data which will also be accessible by the processor(s) 110 and which will be acted on per the software instructions stored in memory/media device 112. For example, in one particular embodiment, memory device 114 may store input data such as images and related information received from first and/or second image capture devices 102, 103 that is then subjected to various image processing routines stored as executable instructions within memory device 114. Additional input data stored in memory device 114 may include data received from one or more integrated or peripheral input devices 116 associated with electronic device 100.

Output data may also be stored in memory device 114 or in another memory location. Output data may include, for example, outputs from various image processing and eye tracking algorithms (e.g., display signals, audio signals, communication signals, control signals and the like) for temporary or permanent storage in memory, e.g., in memory/media device 114. Such output data may be later communicated to integrated and/or peripheral output devices, such as a monitor or other display device, or as control signals to still further components.

Computing device 106 may thus be adapted to operate as a special-purpose machine by having one or more processors 110 execute the software instructions rendered in a computer-readable form stored in memory/media element 110. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific integrated circuits.

The various memory/media devices of FIG. 1 may be provided as a single portion or multiple portions of one or more varieties of computer-readable media, such as but not limited to any combination of volatile memory (e.g., random access memory (RAM, such as DRAM, SRAM, etc.)) and nonvolatile memory (e.g., ROM, flash, hard drives, magnetic tapes, CD-ROM, DVD-ROM, etc.) or any other memory devices including diskettes, drives, other magnetic-based storage media, optical storage media and others. In some embodiments, at least one memory device corresponds to an electromechanical hard drive and/or or a solid state drive (e.g., a flash drive) that easily withstands potential shock damage. Although FIG. 1 shows two dedicated memory devices 112, 114, the content stored within such devices may actually be stored in a single memory device, multiple memory devices or multiple portions of memory. Any such possible variations and other variations of data storage will be appreciated by one of ordinary skill in the art.

Referring still to FIG. 1, various peripheral devices also may be coupled to or integrated with central computing device 106 to assist with providing additional optional functionality for an eye tracker 100. In one embodiment, such additional peripheral devices may include one or more of an input device 116 (e.g., keyboard, joystick, switch, touch screen, microphone, eye tracker, camera, or other device), speaker 118, communication module 120, and a peripheral output device 122 (e.g., monitor, printer, microphone, camera or other device).

The inclusion of speaker(s) 118 may be especially useful when eye tracker 100 is provided as part of a speech generation device or other computer-based device so that text to speech functionality provides audio output to a user. Speakers can be used to speak messages composed in a message window as well as to provide audio output for interfaced telephone calls, speaking e-mails, reading e-books, and other functions. As such, the speakers 118 and related components enable the electronic device 100 to function as a speech generation device, or a particular special-purpose electronic device that permits a user to communicate with others by producing digitized or synthesized speech based on configured messages. Such messages may be preconfigured and/or selected and/or composed by a user within a message window provided as part of the speech generation device user interface.

One or more communication modules 120 also may be provided to facilitate interfaced communication between the electronic device 100 and other devices. For example, exemplary communication modules may correspond to antennas, Infrared (IR) transceivers, cellular phones, RF devices, wireless network adapters, or other elements. In some embodiments, communication module 120 may be provided to enable access to a network, such as but not limited to a dial-in network, a local area network (LAN), wide area network (WAN), public switched telephone network (PSTN), the Internet, intranet or ethernet type networks, wireless networks including but not limited to BLUETOOTH, WI-FI (802.11 b/g), MiFi and ZIGBEE wireless communication protocols, or others. The various functions provided by a communication module 120 will enable the device 100 to ultimately communicate information to others as spoken output, text message, phone call, e-mail or other outgoing communication.

Referring still to FIG. 1, it should be appreciated that a computing device or other device (e.g., mobile device, computer, speech generation device, or other devices as previously mentioned) that can be controlled by the eye tracking system components described herein may be of a type that displays visual objects on display screen 108 that the user can consider whether to select. Selection software executed by computing device 106 may include an algorithm in conjunction with one or more selection methods to select an object on the display screen 108 by taking some action with the user's eyes either alone or in combination with other selection methods.

For example, optional selection methods that can be activated using the eye tracking features of device 100 to interact with the display screen 108 include blink, dwell, blink/dwell, blink/switch and external switch. Using the blink selection method, a selection will be performed when the user gazes at an object shown on the display device 108 and then blinks for a specific length of time. Additionally, the system also can be set to interpret as a "blink," a set duration of time during which an associated camera cannot see the user's eye. The dwell method of selection is implemented when the user's gaze is stopped on an object on the display device 108 for a specified length of time. The blink/dwell selection combines the blink and dwell selection so that the object on display device 108 can be selected either when the user's gaze is focused on the object for a specified length of time or if before that length of time elapses, the user blinks an eye. In the external switch selection method, an object is selected when the user gazes on the object for a particular length of time and then actuates an external switch. The blink/switch selection combines the blink and external switch selection so that the object shown on the display device 108 can be selected when the user's gaze blinks on the object and the user then actuates an external switch. In each of these selection methods, the user can make direct selections instead of waiting for a scan that highlights the individual objects in the user interface shown in display device 108.

Various features and aspects of the presently disclosed technology that may be implemented in accordance with an eye tracking system as presented in FIG. 1, with other eye tracking systems and/or with methods associated with eye tracking are now presented. Such features include those related to the following topics: (1) zooming/selection technology; (2) visual feedback display technology; (3) text entry technology; (4) word prediction technology; (5) calibration technology; and (6) image capture technology.

Zooming and Selection:

U.S. Pat. No. 6,152,563, Eye gaze Direction Detector, by Hutchinson, Lankford, and Shannon, ('563 Hutchinson et al.) describes an eye-tracking system that allows individuals with disabilities to access a computer. This reference is hereby incorporated herein by reference for all purposes. Such patent employs zooming technology to provide more reliable selection on a computer screen. In essence, eye-tracking systems are fundamentally inaccurate; it is only physiologically possible to detect where someone is looking to within a few millimeters on the screen. At high screen resolutions and with tiny controls, this can make direct selection of a button difficult. To compensate for this, the '563 Hutchinson et al. patent describes a method by which a portion of the screen where the user is looking is first magnified. Then, when the user looks in the magnified area, the user may reliably select what area the user wishes to click.

Figure 2:
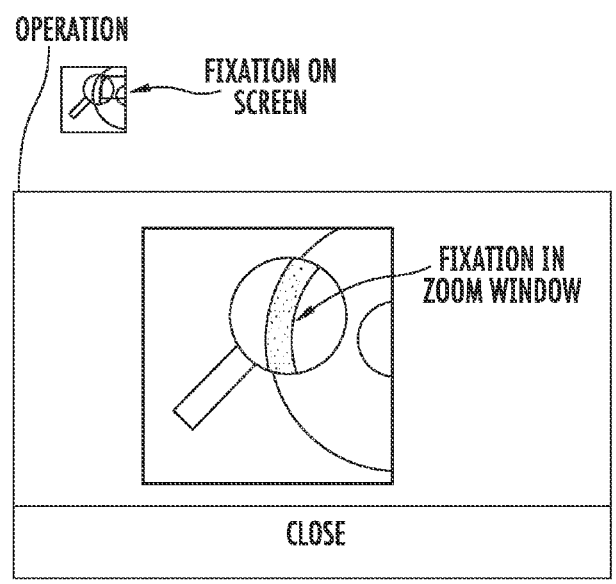
FIG. 2 provides a first screenshot depicting aspects of an exemplary zooming technology, particularly showing user fixation on a screen.

FIG. 2 illustrates an example of such prior art zooming feature. FIG. 2 shows how a zoom window can be initiated when a user fixates or focuses his gaze at a particular point or area on a display screen. Gaze fixation at a point on a screen for some predetermined amount of dwell time can cause a zoom window to pop up near the center of the screen. The region around which the user was fixating appears magnified in this zoom window as shown in FIG. 2. At the bottom of the window is an eye-gaze controlled button that closes the window if the user fixates on the button for a predetermined length of time. The user then fixates his gaze within the zoom window on an item or action which the user would like to select or implement. This zooming feature greatly increases the usability of a computer for individuals with disabilities by providing a reliable means for activating a GUI control and accomplishing various tasks within a GUI environment using only eye control.

The zooming feature depicted in FIG. 2 and described more particularly in the Hutchinson et al. '563 patent may also utilize a display element for visually indicating to a user of the system where and how the user is fixating his gaze. For example, when the user fixates for a predetermined amount of time on a computer display, a red rectangle may appear, centered on the point of fixation. The rectangle serves as a visual cue to the user that if the user keeps fixating at that point, he will be asked to perform a mouse control action or other action at that point. This area represented by the red rectangle may be referred to as the "focus region." Users keep their eyes focused within the focus region to continue timing required to implement an eye-gaze action. Users move their eyes or pointing method outside of the focus region to reset the timing.

A first limitation of the zooming technique disclosed in the '563 Hutchinson et al. patent is that zooming is either always on or always off. This system either selects or zooms depending on the software setting. If zooming is turned off and the user looks at an area of the screen densely populated with controls, false selections would inevitably occur. A user can turn zooming on or off through the software, but this is frequently time consuming. This would sometimes mean that a user would leave the zooming feature turned on, even if the user did not need to use it because the targets they were observing were so large. This would lead to the user always having a two stage selection process. Zooming always occurred first, followed by selection in the zoom window. In light of this limitation, a need remains for contextually aware zooming technology that dynamically knows when zooming is needed and how much zooming is needed so that the system can implement automatic and adaptable zooming features.

A second limitation of the zooming technique disclosed in the '563 Hutchinson et al. patent concerns the focus region used to define user dwell times. The focus region is typically a set pixel size on the screen, regardless of the size of the target to be selected. As such, a need remains for dynamically changing the size of the focus region and how a pointer is updated to better accommodate a user's needs and thus provide faster and more reliable selection.

In light of the above limitations and other considerations, the presently disclosed technology provides features for improving direct or indirect selection of items. Examples given are in the context of controlling a computer application. This disclosed eye-tracking system can serve as an input to the contextually aware selection system described below. Such a selection system is important to having an eye-tracking device serve as an effective tool for communication and computer access.

Figure 3:
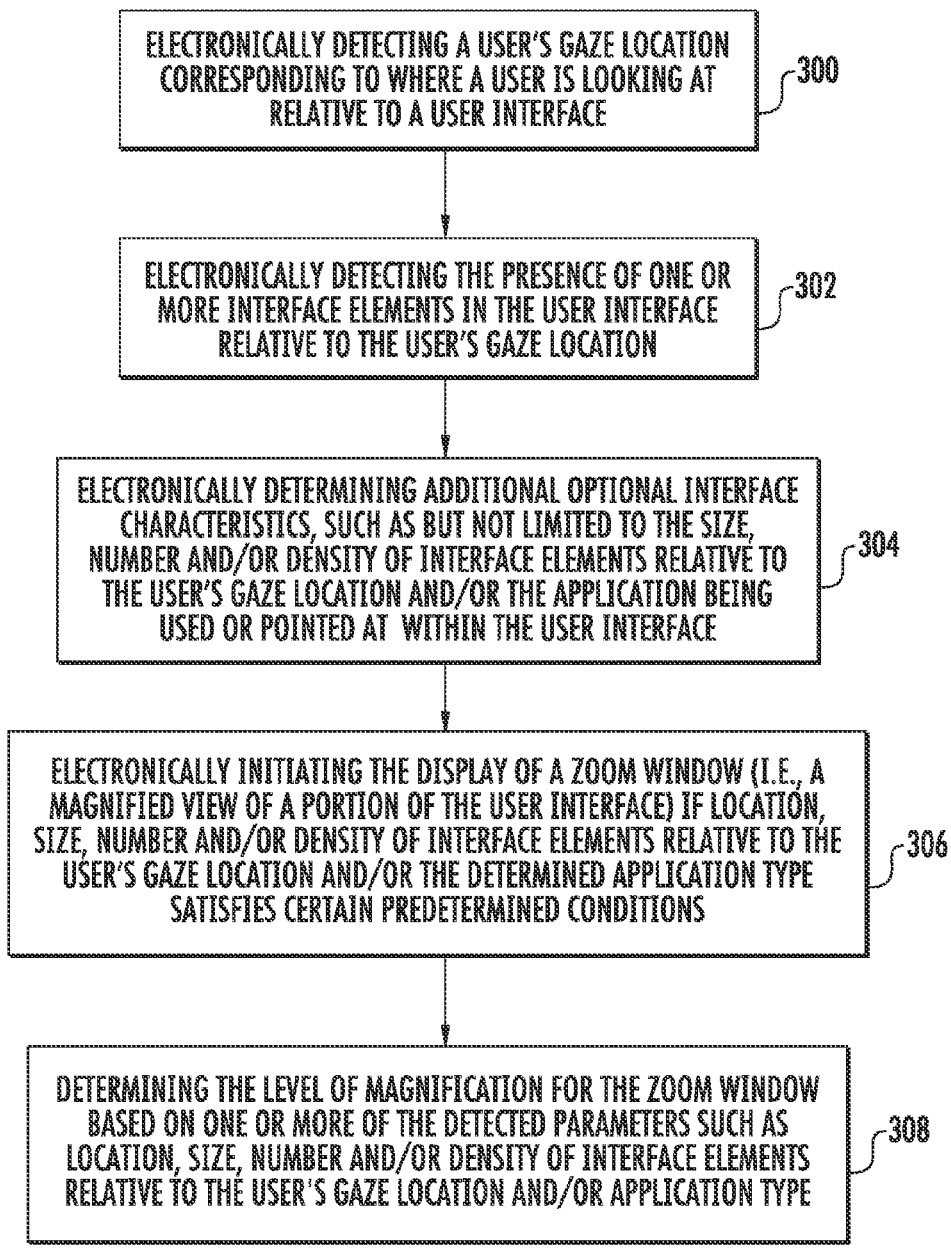
FIG. 3 provides a flow chart of steps in an exemplary method for automatically initiating user interface magnification provided within a zoom feature for an electronic device.

In accordance with such improved selection features, a new method for automatically initiating user interface magnification (e.g, by dynamically determining when to initiate a zoom window) is provided. Referring now to FIG. 3, a first exemplary step 300 may involve displaying a user interface to a user (e.g., via a display device such as a monitor, television or other display screen) and detecting a user's gaze location relative to the user interface, for example, by using the previously described eye tracker hardware and software components. It should be appreciated that the user's gaze location is not something that is static or determined only once, but that is constantly updated or "tracked" in real-time based on the potentially continuous movement associated with a user's gaze. In some embodiments, a pointer or other graphical icon will be visually displayed on the user interface to identify the user's gaze location. The content of the user interface and the user's gaze location are then analyzed relative to one another in order to determine whether or not to implement user interface magnification provided with a zoom window.

Referring still to FIG. 3, a second exemplary step 302 may involve electronically detecting the presence of one or more interface elements in the user interface relative to the user's gaze location detected in step 300. Interface elements provided within a user interface may be defined to include such items as buttons, icons, symbols, hyperlinks, menus, pop-ups, data input locations, or other graphical or video elements. In some embodiments of the disclosed technology, the interface elements of concern are only those elements that are selectable or "reactable." This means that the system is concerned with detecting the presence of items that are selectable (buttons, hyperlinks, etc.) or reactable to some sort of user input (e.g., reactable to a mouse left-click action) but not of background images or simple text that a user may be scrolling through for reading purposes as opposed to interactive purposes. In this way, zooming is only initiated if it will help a user select a specific reactable interface element, not if a user is just reading through or otherwise viewing material on a screen.

In one embodiment, reactable interface elements and the methods by which they react are automatically determined from the operating system. The operating system may present data that an electronic device accesses by calling API commands and thereby interpreting the resulting data to fit its needs (this includes using the UIAutomation or GetClassName API from Windows). These API calls may vary based on the application being interacted with, such as the need to use the Document Object Model for Internet Explorer. The reactable elements and their methods for reaction may also be determined by analyzing the images within a user interface itself. For example, the user interface can be searched to look for enclosed shapes, such as squares or circles in the live bitmap image of the screen by employing pattern recognition techniques. One example of a pattern recognition technique is a generalization of the techniques used to find the eyes as described in the '563 Hutchinson et al. patent. Incorporation of pattern recognition techniques may be especially useful when interacting with older software or software from smaller software companies that do not follow operating system conventions.

In some embodiments of the presently disclosed technology, it is possible to employ more features than merely a detection of an interface element in some proximate location relative to the user's gaze location to help dynamically determine when to initiate the display of a zoom window. For example, in some embodiments, an optional step 304 involves detecting additional information such as the size, number and/or density of user elements relative to a user's gaze location (e.g., in some predetermined area around or near the user's gaze location). In this way, if a large number of reactable elements are determined to surround a user's gaze location, zooming can be automatically implemented to help a user see and select from among the many interface elements. If one or more interface elements surrounding a user's gaze location are smaller than some predetermined size level thus presenting potential fixation difficulty for a user, zooming can be automatically implemented to help a user see and select the interface elements by using a magnified view. If the density of interface elements (e.g., the number of interface elements detected within a given screen size area—defined by pixels, inches, cm, etc. in one or more dimensions) surrounding a user's gaze location is higher than some predetermined level, then zooming can be implemented. In still further examples, the type of application within which the user interface is provided (e.g., a word processor, web browser, gaming environment, etc.) or that is beneath the user's gaze location (and corresponding pointing location) can be used to assist with the dynamic evaluation process to determine whether or not zooming should be implemented.

The predetermined attributes and corresponding levels which will initiate display of a zoom window may be programmed as default values within the system. Additionally or alternatively, it is possible for a user to provide customizable inputs to an eye tracking system that define specific predetermined attributes and corresponding levels for the above characteristics and others under which zooming should be initiated. After detection of such characteristics in steps 302 and/or 304 (e.g., after determining whether location, size, number and/or density of interface elements relative to the user's gaze location satisfies certain predetermined conditions), step 306 involves electronically initiating the display of a zoom window (i.e., a magnified view of a portion of the user interface).

In any version, the zoom window initiated in step 306 may appear either at the center of the screen or directly over the area the person is pointing at. Note that the zoomed window may not be a static snapshot of the content underneath where the user is pointing. The zoomed window may continuously update what it shows based on what the application it is zooming into is doing (the application may be updating its display based on drawing animations, processing its own data, etc.), and the zoomed window may not look like a window at all. It may just look as if the screen is just enlarging.

The above characteristics and others may be evaluated to determine not only whether to implement zooming, but also what level of magnification to implement within a zoom window. As such, an additional step 308 may involve determining the level of magnification for the zoom window based on one or more of the detected parameters such as location, size, number and/or density of interface elements relative to the user's gaze location. For example, if the interface elements around a user's gaze location are relatively small in size or have a relatively high density level, a higher level of magnification may be implemented. In some embodiments, multiple iterations of zooming may be needed to achieve a desired level of magnification to accommodate high density levels or other determined characteristics associated with a user interface. Again, the desired level(s) of magnification may be programmed as default values within the system or may be customizable based on user inputs.

Characteristics associated with the user's gaze time or with other predetermined user actions may be evaluated to determine the timing of when to display the zoom window. For example, the initiation of the zoom window if zooming is enabled per the above dynamic analysis may be based at least in part on the length of time a user's gaze location remains anywhere within a predetermined area associated with the user interface. In one example, a determination is made as to how long a user's gaze location remains within a predetermined graphical feedback area such as a focus region that is displayed around the user's gaze location.

In some embodiments of the present technology, the determination of whether to automatically initiate a zoom window may additionally or alternatively depend on analysis of the structure of eye movements determined by detecting the user's gaze location. For example, in an eye-tracker, if the eye-tracking movements follow the movements defined for reading (i.e. for English speakers, left to right movements moving progressively downward), then the system may not want to initiate the zoom window even if the user is reading hyperlinks or other selectable items. As such, determining a user's task based on eye movement structure or other inputs and dynamically determining whether to initiate a zoom window may be another feature of the presently disclosed technology.

Figure 4:
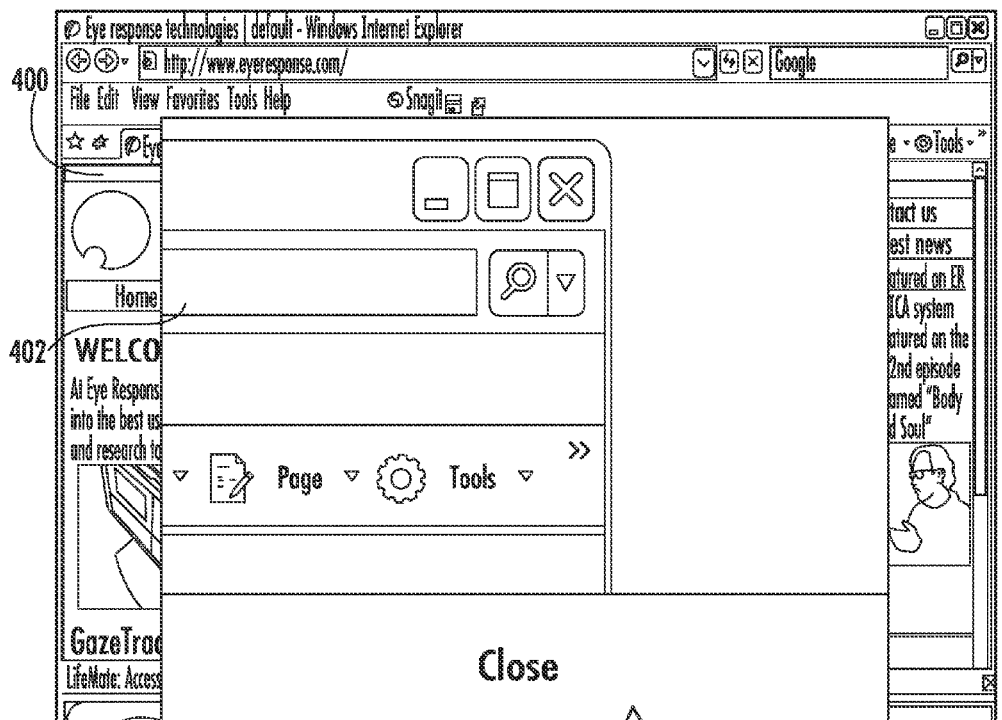
FIG. 4 provides a screenshot view of an exemplary embodiment of a zooming feature whereby a zoom window is automatically presented to a user in response to analysis of the user interface.

Referring again to FIG. 3, once a zoom window is initiated in step 306, a user may then point in the zoomed window at the object he wishes to click on. For example, referring to FIG. 4, an exemplary user interface 400 is shown after the disclosed auto-zooming technology initiates the display of a zoom window 402 to assist a user trying to click on the "X" button to close a window. The "X" button is relatively small with other controls around it (e.g., minimize and maximize buttons), and so the zoom window may appear to allow more reliable selection of this particular button instead of other adjacent buttons. After a user looks at a desired interface element within a zoom window, an electronic reaction associated with the given interface element may be implemented. For example, when a user looks at the magnified "X" button within the zoom window 402 of FIG. 4, an electronic reaction corresponding to closing the window may be implemented. In some embodiments of the presently disclosed technology, the implementation of the electronic action occurs not by a user looking at the given interface element, but by some other predetermined user action or combination of actions, such as but not limited to one or more of blinking, fixating user gaze for a predetermined dwell time, pressing a button or switch, speaking a command and/or other designated user action.

Additional features associated with the subject zooming and selection technology are further directed to characteristics of a focus region. In one example, a graphical feedback element defining the focus region (e.g., an outlined rectangle or other shape, highlighted region, or other visual identifier) and/or any additional displayed visual feedback is configured to substantially match the area (including size and/or shape) defining one or more interface elements within either a user interface or magnified user interface (i.e. zoom window). In some embodiments, as a user views a standard user interface, some or all of the objects that will appear in a magnified representation of such user interface (i.e., the zoom window) are highlighted or otherwise identified using a visual feedback element prior to zooming. For example, any selectable or reactable interface elements in a region around where the user is looking may be highlighted so that a user can know prior to whether or not a zoom window is initiated whether or not a potential object of interest would be inside of that zoom window. This feature could reduce or avoid potential frustrations or inefficiencies for a user and would be especially useful in a situation where zooming will occur due to high density of elements.

Figure 5:
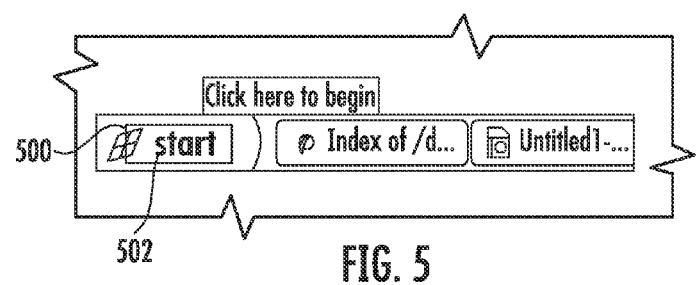
FIG. 5 provides a screenshot view of an exemplary embodiment of auto-regioning a display element (e.g., the start button) in accordance with an aspect of the presently disclosed technology.

Exemplary aspects of a focus region feature are shown in FIG. 5 where a focus region 500 provided as a colored rectangle is formed to match the size of a reactable interface element corresponding to the toolbar button 502 in a software application (namely the Start button in the MICROSOFT® WINDOWS® interface). By matching the focus region to an interface element, and particularly to an interface element that is of selectable interest to a user, the user is provided with a better visual indication of what he/she is looking at. In addition, such arrangement may decrease the possibility that a user's gaze will fall off of an object that the user is trying to select. It should be further appreciated that these features related to the focus region may be applied not only to an initial user interface but also to zoomed objects within one or more iterations of a zoom window. In fact, various characteristics of the zoom window itself may be determined by characteristics of the objects within the focus region or characteristics of the focus region itself (size, location, density or other characteristics as previously mentioned).

With further reference to the focus region, some embodiments of the presently disclosed technology are configured to implement the display of a visual feedback element at a designated location within the focus region while a user's detected gaze location remains anywhere within the focus region. For example, display and updating of the pointing device or other graphical feedback element used within the eye-tracker to show where a user is looking may be disabled while timing is occurring (i.e., while a user's dwell time within the focus region is accumulated to reach a selection point). This reduces distractions to the user as the user tries to complete the zooming process. Placing the pointer of the pointing device at the center of the focus region while timing occurs can also alleviate the inaccuracies in the pointing device.

With further reference to the implementation of visual feedback elements to assist a user's interaction with a display, it should be appreciated that a variety of different types of visual elements may be used. For example, the visual feedback element defining the focus region (e.g., outlined box or highlighted region) or the additional feedback element optionally shown within the focus region (e.g., pointer-type device) may differ based upon the action to be initiated. Different feedback elements (or different colors, sizes or other features associated with the feedback elements) may be employed for different types of actions such as, for example, a left-click, right-click, zoom, and the like.

With further reference to exemplary aspects of the present technology, there are many ways in which system reactions may be implemented to interact with zoomed objects within an interface. For example, the method by which an object selected in a zoomed or unzoomed view of a user interface reacts can occur automatically depending on what selection method is chosen (e.g., blink, dwell, blink/dwell, blink/switch, external switch, voice activation, etc.) Once a selection mode is captured, a desired action may be implemented, such as a left click to the desired object or a direct interaction with an object through API calls, such as sending a specific windows message to drop a combo list in Windows.

Interface menus and customizable features may also be provided allowing a user to customize additional selection settings. For example, one setting may enable a user to override the default object reaction to be some other task the user wishes to perform, such as right clicking. With another set of settings, the person may just keep pointing in a high density area in the vicinity of the object they wish to invoke/click, and the zoomed view keeps becoming progressively more zoomed until the object fills the selection/zoom window or reaches an object density in which the system feels it can reliably make a selection based on the user's center of focus, then it is invoked/clicked. This cascading effect allows the system to deal effectively and quickly with high density areas.

Visual Feedback Display:

Another feature of the presently disclosed technology concerns a system and method for displaying and updating visual feedback elements for an eye tracking device. In particular embodiments, a visual feedback element, such as a pointer shown on a display to represent the user's gaze location, has its position updated when reactable elements are pointed at or close by to the pointer (and corresponding user's gaze location). This may be referred to herein as a "Magnet Mouse" mode of operation. Any movement by the pointer between reactable elements is eliminated. In the case of an eye-tracker, this makes use more naturalistic; when the user is reading text on the screen, for example, no cursor updating occurs if the software is set to use the default reaction for an element (because text would have no default action on a web page). Then if the user looks at a hyperlink or toolbar or in the vicinity of either, the cursor snaps to that object's location and the default reaction or zooming may occur. If the software is set to drag by default, for example, then pointer updating may occur all over the page because any text on a web page may be highlighted.

As previously mentioned, reactable elements and the methods by which they react may be manually defined and/or may be automatically determined. In the example where a user manually defines what is considered to be a reactable element, a user may choose to define certain pre-defined items such as hyperlinks, selectable buttons, menus, icons, symbols, data input locations, or other items as reactable elements. In the example where reactable elements are automatically determined, such determination may be implemented by the operating system. For example, in a MICROSOFT® WINDOWS® environment, the operating system may present data that the presently disclosed technology accesses by calling Application Program Interface (API) commands and interpreting the resulting data to fit its needs (this includes using the UIAutomation or GetClassName API from Windows). These API calls may vary based on the application being interacted with, such as the need to use the Document Object Model for Internet Explorer. In another example where reactable elements are automatically determined, pattern recognition techniques may be applied such that the reactable elements and their methods for reaction are determined by analyzing the screen images themselves. Such processing algorithms may search a user interface looking for enclosed shapes, such as squares or circles in the live bitmap image of the screen by employing pattern recognition techniques, such as generalizing those used to find the eyes in the Hutchinson et al. '563 patent. This is especially useful when interacting with older software or software from smaller software companies that do not follow operating system conventions. It is important to note that these methods require no special changes to the operating system or off-the-shelf software that the subject eye tracking systems are designed to control. Everything functions seamlessly with standard software, such as Internet Explorer or Microsoft Office.

Figure 6:
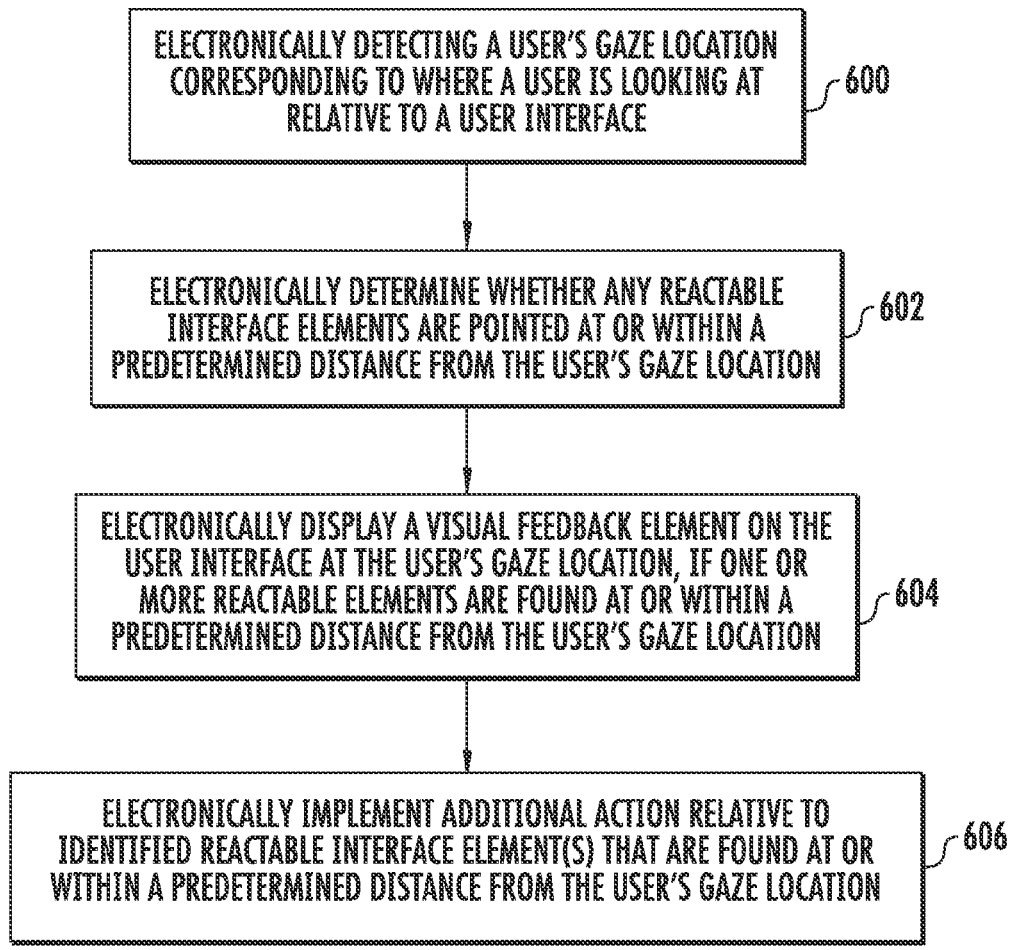
FIG. 6 provides a flow chart of steps in an exemplary method for displaying and updating visual feedback elements in an eye tracking device.

Referring now to FIG. 6, a particular exemplary method of implementing the above features and steps is set forth. For example, a first step 600 in an exemplary method of displaying and updating visual feedback elements corresponds to electronically detecting a user's gaze location corresponding to where a user is looking at relative to a user interface. In step 602, a determination is made as to whether any reactable interface elements are pointed at or within a predetermined distance from the user's gaze location. In step 604, a visual feedback element is electronically displayed on the user interface at the user's gaze location, if one or more reactable elements are found at or within a predetermined distance from the user's gaze location. The visual feedback element could be any type of visual display features as previously described, including but not limited to a pointer placed directly on the user's gaze location or an overlying image or icon placed over all or a portion of an area surrounding the user's gaze location (e.g., a fixed or expanding circle having its center of origin substantially corresponding to the user's gaze location). The features described in this section may also apply to the display of a visual feedback element used to define a focus region (e.g., standard sized box outline or customized highlighted regions snapped to one or more interface elements).

In some embodiments of the present technology, the determination of whether to display or update a visual feedback element such as a pointer or element highlighting may additionally or alternatively depend on additional analysis of the structure of eye movements determined by detecting the user's gaze location. For example, in an eye-tracker, if the eye-tracking movements follow the movements defined for reading (i.e. for English speakers, left to right movements moving progressively downward), then the system may not want to display or update a pointer even if the user is reading hyperlinks or other selectable items. As such, determining a user's task based on eye movement structure or other inputs and dynamically determining whether to display a pointer or other visual feedback element may be another feature of the presently disclosed technology.

Referring still to FIG. 6, an additional optional step 606 may correspond to the electronic implementation of additional action(s) relative to identified reactable interface element(s) that are found at or within a predetermined distance from the user's gaze location relative to a pointer or other visual feedback element. For example, the visual feedback element may be configured to snap to the closest reactable element within the user interface to the user's gaze location. As another example, a focus region may be displayed that surrounds the user's gaze location and the pointer. As previously described, in some embodiments such focus region may correspond in shape and size to the reactable element at or closest to a user's gaze location. In a still further embodiment, the initiated display of a pointer or other visual feedback element when a user is looking at a reactable element may be followed or supplemented by a reaction such as automatic zooming to create a magnified view around the reactable element and/or initiation of the default reaction associated with the reactable element (e.g., pulling up the URL for a website defined by a certain hyperlink).

In a still further embodiment, detected reactable elements are provided as input to possible scanning choices for selection by a user employing a scanning access method for the eye gaze detection system. In the case of non-direct selection methods, such as scanning, the reactable elements provide the input data for dynamically grouped scanning. In essence, the rows and columns of only reactable elements are scanned, thus focusing the options for possible selection by a user. The user may actuate a switch to select the row, column, or particular element that is currently highlighted during the scanning process. Elements in the user interface that are not reactable or selectable are disabled are skipped by the visual highlighting process.

Text Entry Inputs:

Yet another feature of the presently disclosed technology concerns efficient text entry options for controlling computer applications or for communicating through computer technology. A method for implementing such efficient text entry features is generally depicted in the flow chart of exemplary steps set forth in FIG. 7. Examples of user interface features that may be implemented at selected steps in the method of FIG. 7 are depicted in FIGS. 8-10, respectively.

Figure 7:
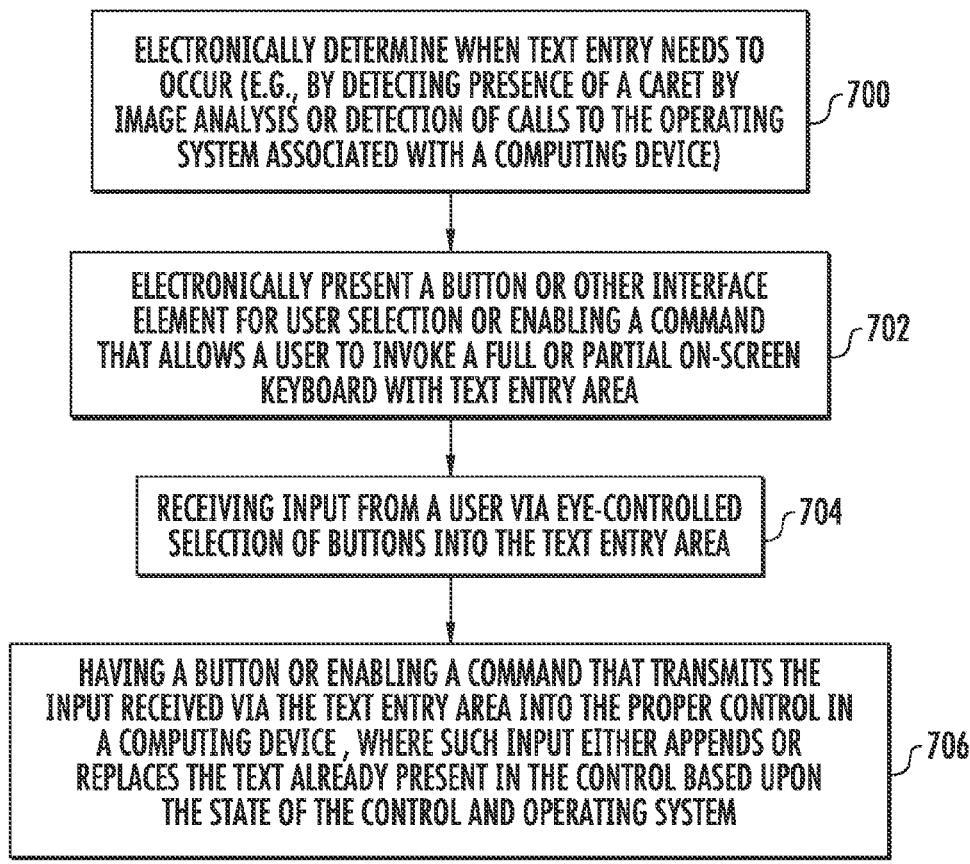
FIG. 7 provides a flow chart of steps in an exemplary method of providing text entry input features for use in an eye controlled interface.
Figure 8:
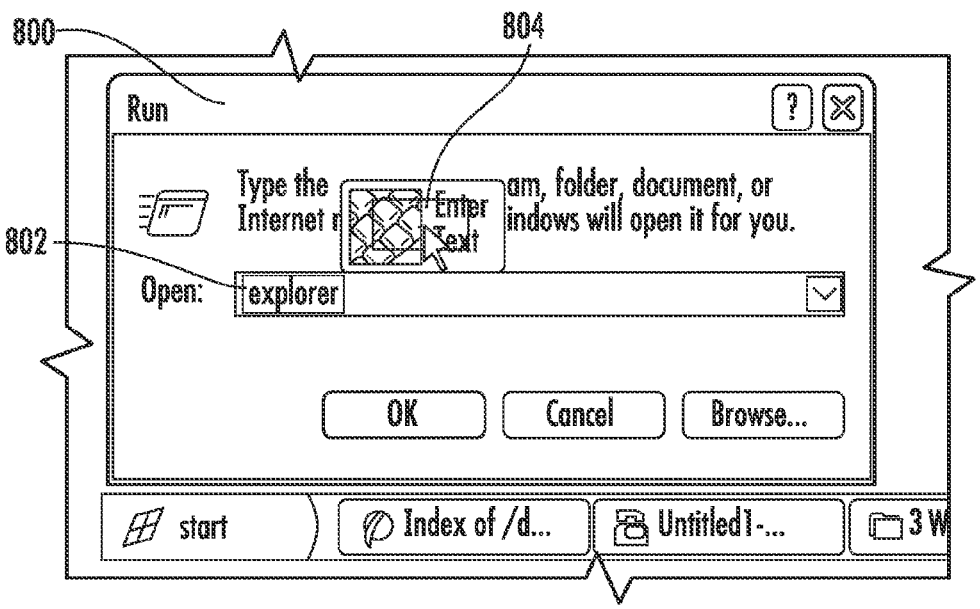
FIG. 8 provides a screenshot view of an exemplary embodiment of a feature (e.g., text entry button) for implementing an on-screen keyboard to assist with user entry of text via eye controlled input.

Referring now to FIG. 7, a first exemplary step 700 in a method of implementing efficient text entry is to electronically determine when text entry needs to occur within a user interface. In the case of text entry into other applications, whether or not text entry needs to occur is usually determined by the presence of the caret, the blinking shape that appears in text entry areas in WINDOWS. In one example, the presence of a caret can be determined by detecting the presence of a command call to an operating system, such as but not limited to an API call, such as GetGUIThreadInfo in MICROSOFT WINDOWS. In another example, the presence of a caret can be detected by analyzing a live sequence of bitmap images to detect if a blinking caret exists. This latter option may be helpful in instances when web pages, for example, do not reliably notify the OS of a caret's availability. Such image analysis may be accomplished just by looking at the pixel changes in a control when no input is occurring. Changes matching the color inversion, width, and height of a caret as defined by the OS may indicate the presence of a caret.

When a caret is detected in step 700, a button or other interface element may then appear above the caret in step 702. Such interface element is referred to herein as the "Enter Text button." An example of an Enter Text button depicted in the context of an exemplary user interface is shown in FIG. 8. In FIG. 8, a user interface 800 includes a control element 802 in which text entry needs to occur. In response to such detection in step 700, an Enter Text button 804 is displayed to a user, for example above the control element 802 in which text entry needs to occur. A user may then select the button 804 to open an onscreen keyboard with its own input area that allows the user to type desired text using eye controlled selection of the onscreen buttons. An example of an on-screen keyboard that may be displayed to a user is shown in FIG. 9.

Figure 9:
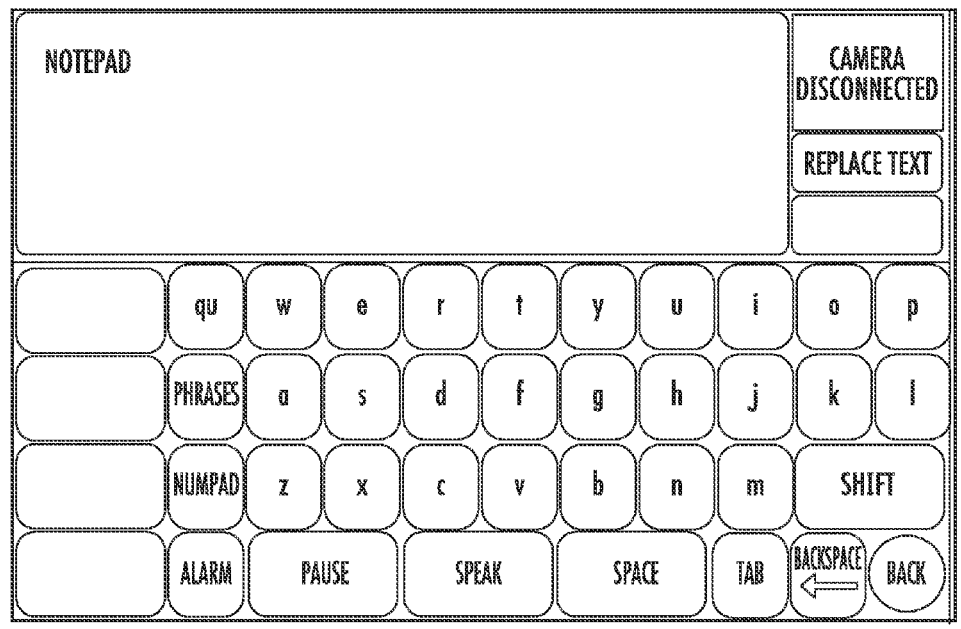
FIG. 9 depicts an exemplary embodiment of a keyboard user interface that may be provided to a user, for example, in response to selection of the text entry button such as illustrated in FIG. 8.
Figure 10:
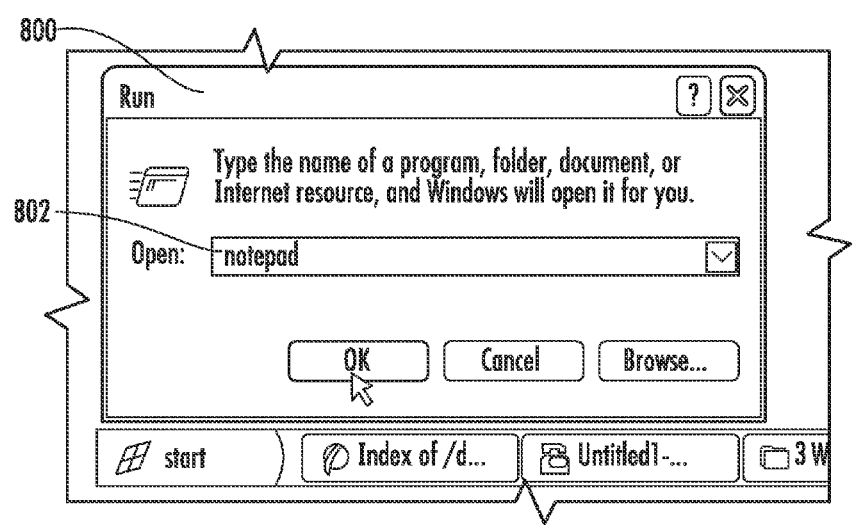
FIG. 10 provides a screenshot view of the exemplary embodiment of FIG. 8 after text was entered by a user with the keyboard user interface of FIG. 9.

Once an on-screen keyboard is displayed as shown in FIG. 9, the system may then receive input from a user via eye-controlled selection or other selection method for actuating the alphanumeric content or other selectable interface items (i.e., keys) available in the keyboard. In the example of FIG. 9, a user provides eye-controlled selection of the appropriate buttons to spell the word "notepad." Once the receipt of desired text input is complete, a user may select an additional button (e.g., the "Replace Text" button in FIG. 9) or implement another command that causes the received text input to either replace or append the text that was previously provided in the text entry control element. FIG. 10 shows how the text input corresponding to the word "notepad" entered via the on-screen keyboard of FIG. 9 replaces the previous text "explorer" within the text entry area 802 of the same user interface area 800 previously described with reference to FIG. 8. This text appending or replacing occurs as part of step 706 in the method of FIG. 7.

As part of the steps in FIG. 7, the state of the computing device may be analyzed to determine whether to implement text replacement or text appending and/or to determine specific features to selectively display within an on-screen keyboard. Different characteristics that may be analyzed may include one or more of the following: the type of control (e.g., text box, rich text box, etc.), the application using the control (e.g., Internet Explorer, Wordpad, etc.), the content of the text already in the control (e.g., whether certain alphanumeric characters, symbols, or strings of text such as "http" or "@" are included) and the amount of text already in the control (e.g., total number of characters). For example, consider a text box control for entering the URL address in a web browser. The particulars of this type of control may be determined because of the type of control (e.g., a text box for defining a web address), the type of application (Internet Explorer, Mozilla Firefox, Safari, etc.), the content of the text (e.g., detection of "http") and/or other analyzed state(s) of the computing device. Once the text box control is identified as such, a special on-screen keyboard with shortcuts associated with a web address may be provided, and the text typed using that special keyboard may then be a replacement of what was previously in the text box.

In some embodiments, such analysis may additionally or alternatively be applied to control elements in the vicinity of the element in which a user is inputting text. For example, the type of one or more nearby controls, the application(s) using one or more nearby controls, the content and/or amount of text in one or more nearby controls may be analyzed. Analysis of control elements near a control element of interest may be particularly helpful to provide more comprehensive analysis in determining whether to append or replace text. In addition, analysis of nearby control elements would be helpful when no text is provided in a control element of interest.

It should be appreciated that the various settings for how efficient text entry features are implemented in accordance with the presently disclosed technology may be defined by default settings or may be customized by a user by presenting a menu interface of selectable choices. Although in some embodiments, such features are all user adjustable settings, certain default rules may be implemented. For example, text boxes may be generally configured to replace text and rich text boxes may be configured to append text if more than one-hundred (100) characters are present. This behavior may change depending on which application (e.g., Internet Explorer or Wordpad) has the rich text box (Wordpad would always append for example because you are writing a document). Additionally, if the amount of text is less than one-hundred (100) characters or if the control is not a text box, the text is extracted from the control and placed into the input area for modification.

This text entry method has the primary advantage over other available onscreen keyboards of not requiring either an extremely small onscreen keyboard to type into other applications or requiring the other applications to be shrunk down to an extremely small size to accommodate the presence of a large onscreen keyboard. In the presently disclosed system and method, text entry occurs within features provided as part of the technology, and the system then transmits the text either through simulated keystrokes or through operating system API calls, whichever is appropriate and more accurate, based on the control or application. The control or application may also define what task the user wishes to perform, such as entry of an e-mail address, and bring up a specific onscreen keyboard based upon the task being performed when the Enter Text button is clicked. For example, a keyboard may be configured to include the ".com" shortcut as a button on its screen if the user is entering an e-mail address or web page URL.

With still further reference to the presently disclosed text entry features, the task being completed and the response due to that task may be detected based upon the structure of the pointing device's movements and text generation status. For example, in an eye-tracker, if the eye-tracking movements follow the movements defined for reading (i.e. for English speakers, left to right movements moving progressively downward), the text entry options or reactable element options may change (no Magnet Mouse pointer updating even if a hyper link is read in the course of non-disrupted normal reading, for example). Or as another example, if the pointer does not change and text is being consistently generated, then typing is occurring. This means settings related to selection may be disabled or set to highlighting/ dragging by default instead of clicking. The Enter Text button may disappear as another example. As such, determining a user's task based on eye movement structure or other inputs and dynamically changing how and what input may occur as a result may be another feature of the presently disclosed technology.

Word Prediction Features:

All of the methods described above are also useful for the communication functionality granted by the presently disclosed technology. The subject systems and methods can present buttons for typing letters or words or phrases, and these buttons fall within the context of reactable elements described herein. These buttons can potentially perform innumerable commands, such as changing the active layout of buttons, sending infrared commands out of a remote built into a computer, or launching applications. The invention is an extensible framework where additional functionality can be added with further development.

Figure 11:
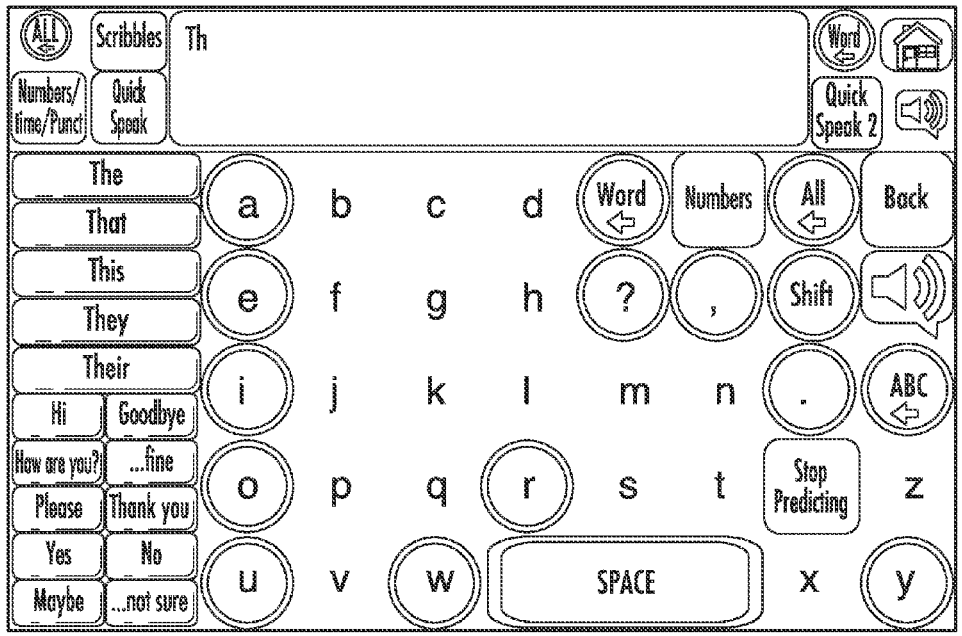
FIG. 11 depicts an exemplary embodiment of a user interface having contextually aware button states based on the input provided by a user.

When typing with an onscreen keyboard or with any application containing a message composition or content window, the presently disclosed technology may also provide features for predicting what words the user wishes to type and should the user select the button containing that word, the invention will then type that entire word without the subject selecting each letter in the word. While the user types, features may be provided to limit the other letters available based on whether or not any prediction matches contain the next letter to be typed at the current location in the word being typed. For example, as shown in FIG. 11, the letter "e" and possible other vowels would be available if the letters "Th" were already provided in a message composition window and a third letter was about to be typed and/or if "then" was a prediction choice based upon already entered text or other words. Such limited button selections may also be determined based on a comparison of text entered in the message window to a database of dictionary entries.

The inclusion of such word prediction features greatly reduces the available targets to the user and leads to more reliable selection if the user is having difficulties being accurate. A button in the software may easily disable this feature for the current word to allow the user to type a word not in the dictionary. The invention may auto-learn the word typed so that it is then present in its dictionary the next time the user types the word. This feature also greatly increases the scanning speed of users when they use indirect selection methods because entire buttons, and possibly entire rows or columns are completely skipped by the software if they are disabled. This is another example of how the invention looks at controls and their current state to reduce the choices available to the user to those relevant to the current context in which the user is operating.

Another important feature offered by certain exemplary embodiments of the disclosed technology is called auto-conjugation. This feature adjusts the labels and command data typed by particular buttons based upon the text appearing in the input area. For example, to speed typing, predefined buttons may be mapped to pronouns of the English language, such as I, he, she, or they. Other buttons may be mapped to auxiliary verbs, like am, were, had, have. Still other buttons may be mapped to verbs, such as ask, go, be. To type the sentence, "I am going", you would hit the "I" button, then the "am" button. You would then want to hit the "go" button and type the letters "ing" after it to get the word you wish. One downside to this approach is that it does not give a significant rate enhancement. So you could set up another onscreen keyboard that appears after you click the "am" button that changes all the verbs to the appropriate tense. Another downside to this approach is that it requires you to create and link many different onscreen keyboard layouts for it to work smoothly, and any change to one layout, such as button order, has to be changed in all the linked layouts. With auto-conjugation, no extensive layout programming or concessions by the user need to be made. The present technology automatically changes the verb buttons to have the appropriate tense based on a defined conjugation dictionary that lists all conjugations for different verbs. When the word "am" appears in the text entry area, the verb buttons automatically change the proper tense. For example, "go" changes to "going". This significantly speeds the data entry by the user and reduces the number of layouts needed by the software. Also, it does not require the user to hit the "am" button to receive the conjugations. The word "am" when it appears in the text entry area, through an auxiliary verb button, the onscreen keyboard, or normal typing, or any other type of auxiliary verb could be used to change the verb buttons.

Figure 12:
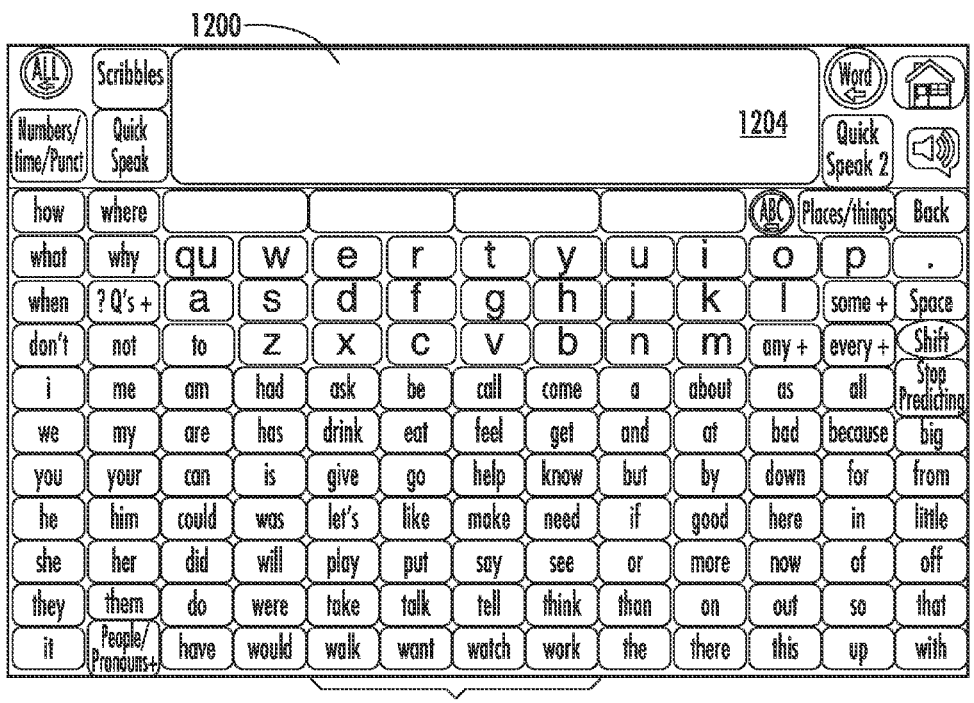
FIG. 12 depicts an exemplary embodiment of a user interface having a subset of buttons (e.g., verbs) that are provided in a first exemplary state (e.g., infinitive form)
Figure 13:
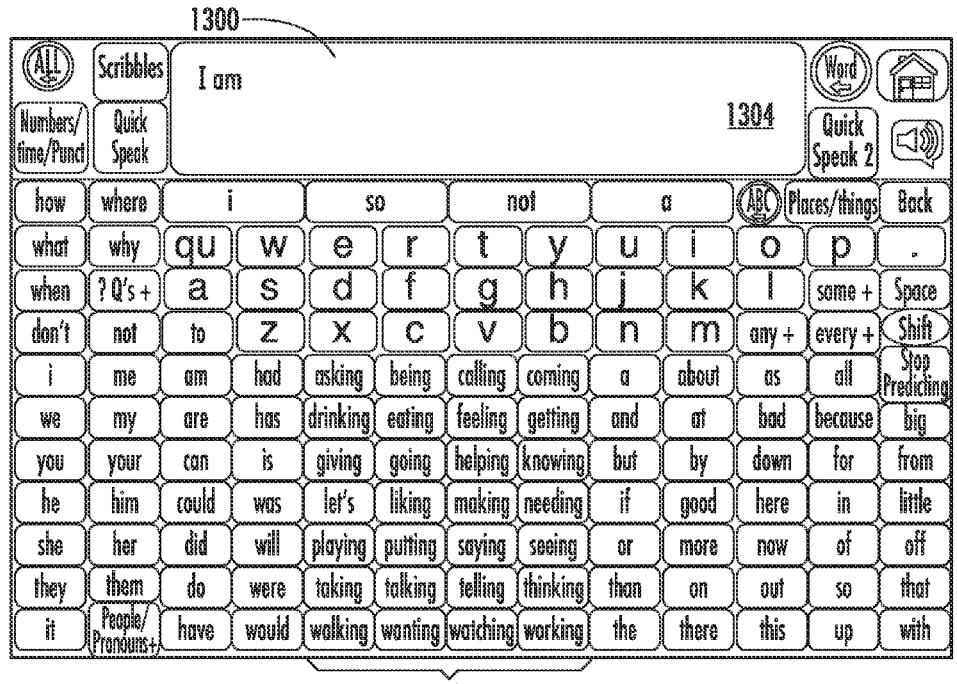
FIG. 13 depicts an exemplary embodiment of a user interface having a subset of buttons (e.g., verbs) that are provided in a second exemplary state (e.g., present participle form) based on input provided by a user (e.g., input in the form of the auxiliary verb "am")

A visual example depicting aspects of the auto-conjugation features is provided in FIGS. 12 and 13. In FIG. 12, a first exemplary onscreen keyboard layout 1200 includes a plurality of buttons that include letters as well as core vocabulary words (e.g., commonly used parts of speech including but not limited to groups of adjectives, adverbs, interjections, nouns, pronouns, main verbs, auxiliary verbs, conjunctions, determiners, etc.) In one example, a group of buttons 1202 shown in FIG. 12 includes a set of commonly used main verbs shown in their infinitive form. This group of buttons 1202 may dynamically change based on user input into the text entry or message composition window 1204. For example, referring now to FIG. 13, after a user interacting with user interface 1300 provides text entry into message window 1304 corresponding to the words "I am," the core verbs provided in interface section 1202 of FIG. 12 are changed to a group 1302 of the same verbs in their present participle form based on detection of the auxiliary verb "am" in the message window 1304.

Based on these examples, one of ordinary skill in the art should appreciate that content items (including both the identifying label or visual appearance of a button or other interface element and the underlying command/action the button or other interface element invokes) can change depending on a variety of detected items within a message composition window. For example, when a set of content items includes a particular part of speech (e.g., verbs), then the linguistic form of such content items (e.g., verb forms such as infinitives, gerunds and participles) may be changed depending on the input already provided in the message composition window. In another example, content items may be changed to correspond to one or more particular parts of speech depending on the parts of speech of words already provided in the message composition window. So, for example, content items could include only nouns, adverbs, verbs, etc. based on what part of the sentence was being provided in the message composition window.

One of ordinary skill in the art will further appreciate that the above word prediction and other related text entry features can be applied to any type of predefined, customized or third party user interfaces. As such, a message composition or content window in which text entry or word prediction features are applied could potentially come from a variety of applications running within an operating system, including a custom keypad or a third party application such as notepad, Microsoft Outlook, notepad or the like.

The above is an example of the Rules Framework. The Rules Framework allows users to generically determine how particular buttons or changes to the input area or commands sent by the software define how other buttons respond—be it label changes or command changes on buttons of a particular type. This makes it easy for users to add significant functionality to embodiments of the disclosed technology, such as having customized user defined buttons respond to a shift key being pressed, without actual program changes under the hood required by the developers. Auto-conjugation is just an example of a Rule Framework.

Figure 14:
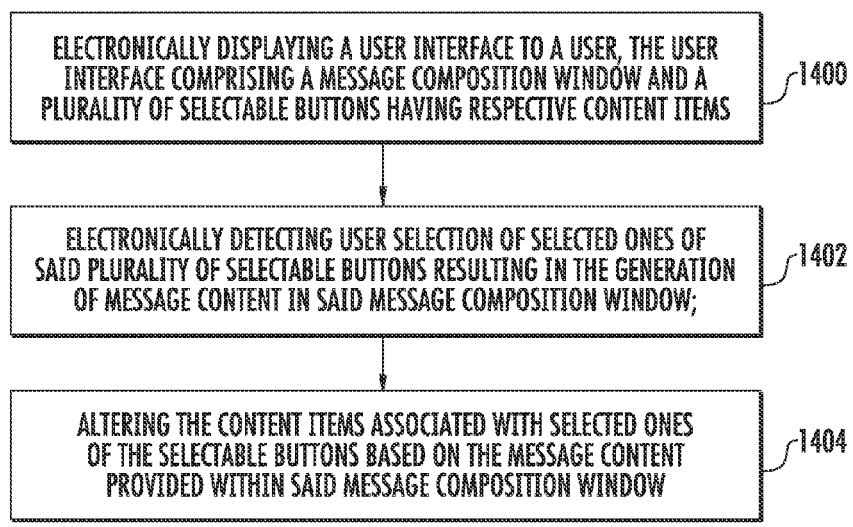
FIG. 14 provides a flow chart of steps in an exemplary method of implementing word prediction features for a graphical user interface.

Based on the above disclosure, additional description of a method of implementing the above exemplary word prediction features and others for a graphical user interface are now discussed with reference to FIG. 14. Referring to FIG. 14, a first exemplary step 1400 in such method involves electronically displaying a user interface to a user. As shown in the exemplary interfaces of FIGS. 11-13, a user interface may include such interface elements as a message composition window and a plurality of selectable buttons having respective content items (i.e., labels and corresponding actions which may include such items as letters, numbers, words and/or symbols).

In step 1402, content provided within a message composition window is detected or determined. Such content may be provided as a result of user selection of selected ones of the plurality of selectable buttons within the user interface. User selection of such buttons may typically result in the generation of message content in the message composition window portion of the user interface. User selection of such buttons may occur using different types of input interfaces. For example, an eye tracker may be used as an input interface such that detecting button selection involves tracking a user's eye gaze location relative to the buttons on a user interface. In another example, a touch screen display may be used as in input interface such that detecting button selection involves detecting user activation of touch screen elements (via capacitive, resistive, pressure sensitive or other type of touch screen activation technology).

After content is detected or determined in step 1402, refresh commands may be sent to an operating system. For example, in a word prediction scenario, updated content provided in a message window is sent with the updated content as the message data. This command with updated content data is used within the system to alter the content items and associated command data associated with various interface elements. As such, a final step 1404 in FIG. 14 may involve altering the content items and corresponding commands associated with selected ones of the selectable buttons based on at least a portion of the message content (e.g., some or all of the specific content, the position of the caret in the message composition window, and/or other aspects of the message content) provided within said message composition window. In one example, such alteration set forth in step 1404 may correspond to making selected ones of the selectable buttons available for selection by a user and other selected ones of the selectable buttons unavailable for selection to a user, similar to the arrangement depicted in FIG. 11 where some letters are available and others are not. In another example, the alteration in step 1404 may correspond to changing the form of a given set of content items that have labels corresponding to particular type of speech (e.g., verbs being changed from infinitive to present participle form as depicted in FIGS. 12 and 13).

Auto-Calibration:

One example of a known method for calibrating an eye tracking system is disclosed in U.S. Pat. No. 6,152,563 (Hutchinson et al. '563). To measure where someone is looking, the Hutchinson et al. '563 patent employs a single camera with a highly magnified view of the eye that identifies the reflections generated off of the eye by a single infrared light emitting diode (LED) mounted at the center of the lens of that camera. Specifically, as shown in the representation of a user's eye 36 in FIG. 15, eye illumination causes the user's pupil 38 to glow and a tiny reflection of the diode, called the glint, to appear off of the cornea. After a calibration procedure, accurately identifying these reflections allows the system of the Hutchinson et al. '563 patent to accurately measure where someone is looking. However, the user can only move his or her head a few inches in any direction and remain in the camera's field of view. This fixed head position requirement makes the system mostly useful to individuals with paralysis and not those with involuntary movements.

Figure 16:
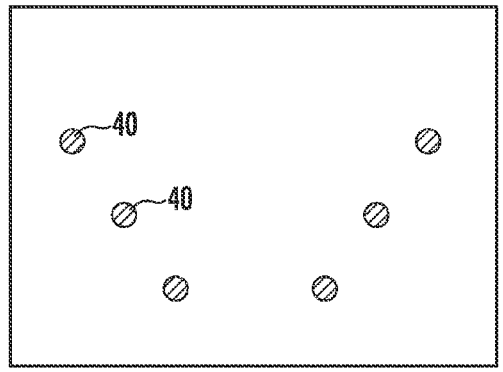
FIG. 16 depicts a prior art screenshot of calibration points required for a user to calibrate a known eye tracking device.

Also, in the Hutchinson et al. '563 patent, the user needs to first look at a series of calibration points on the screen in order for the system to accurately measure where someone is looking on a computer screen. For example, as described in the Hutchinson et al. '563 patent and as depicted in FIG. 16, a user must look at a series of calibration points 40. After looking at the points, the system performs a regression analysis to generate a series of mathematical equations that could output where someone is looking given any vector between a glint and pupil center. A limitation of this technique is that as the head moves in 3D space, the equations need to be altered to maintain accuracy. In the known system, this requires recalibration any time a user's head moves.

In light of the above limitations, an improved system and method for providing auto-calibration in an eye tracking or eye gaze direction detection system is provided. One advantage to such improved technology includes tolerating far greater head motion, allowing the eye tracking system to be used by individuals with involuntary motion while also making the system more easily used by able-bodied individuals in more naturalistic settings, as required by some of the previously identified markets. This is accomplished in part by employing at least two cameras that look simultaneously at a user's entire face (and eye(s)). The resulting wider field of view allows a user to move more freely in front of the system while remaining in view of the cameras.

Another advantage to such improved technology relates to removing the requirement that a user must look to a specific series of calibration points on a display screen. References herein to a calibration-free or auto-calibration system impliedly reference the removal of this requirement. By eliminating the often tedious and time-consuming task of having a user look at certain points or track movement on a screen, the system is far easier to set up and be used by individuals who cannot or will not look at a sequence of calibration points.

Auto-calibration can be achieved in part by using a two camera system as described herein and running continuous eye identification algorithms. By using two cameras with structured lighting, the system can measure physiological properties of the eye that enable it to generate mathematical equations describing the properties of the user's eye without the user looking at a series of calibration points. When the user is in front of the cameras, the system may immediately start tracking and moving the pointer to where the user is looking. This may be accomplished in part by running continuous eye identification algorithms as described herein to detect eye images and gather data required for tracking. For example, when no eye is detected in front of the eye tracker, the eye identification algorithms run continuously so that the system will immediately begin tracking a new person or the original person if that person returns to the camera's field of view. Calibration could immediately and automatically begin once a new set of eyes are found or after no eyes have been found for a set amount of time. Such auto-calibration feature provides an improvement over the known technology from the Hutchinson et al. '563 patent as well as other available eye-tracking devices.

To further accomplish calibration free eye-tracking, it should be appreciated that a calibration model and corresponding calibration equations may be utilized which helps translate gathered eye image data to point locations in a display screen. In general, a particular example of a calibration model that may be used in the present technology models eye movement by generalizing the eye as a sphere. The amount the sphere is rotated is based on the 3D position of the eye and the measure of the vector distance between the pupil center and glint, as seen by the camera(s) and defined more thoroughly in the Hutchinson et al. '563 patent.

A key aspect of the eye tracking calibration technology disclosed herein is to provide a positional independence relative to the calibration model. In particular, a motion tolerant and auto-calibrated system is achieved by understanding that knowing where a particular user's eyes are specifically in space is not required. Instead, the system only requires knowledge of how much the user's eyes have deviated from a previous position in space. Such deviation of the eye's position in space is generally represented by a scaling factor, to be discussed with further reference to FIG. 17. Advantages can be achieved not by changing the calibration model or related equations, but instead by changing the inputs to those calibration equations that change based on the scaling factor. In essence, applying a scaling factor removes a user's specific positional information from captured image data. Such factor works when the user operates in a polar coordinate system based off the glint/pupil positions reported by the eye finding operations.

Figure 17:
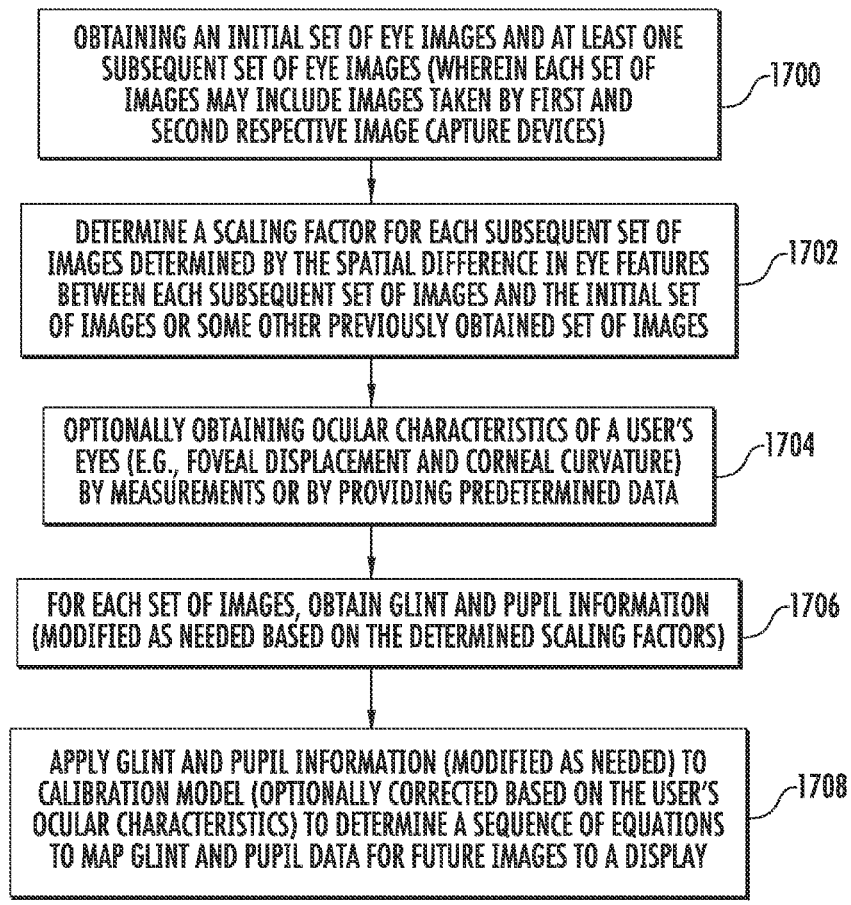
FIG. 17 provides a flow chart of steps in an exemplary method of providing automatic motion-tolerant calibration for an eye tracking device in accordance with exemplary aspects of the presently disclosed technology.

Referring now to FIG. 17, a first step 1700 in an exemplary method of providing automated motion-tolerant calibration for an eye tracker involves obtaining an initial set of eye images and at least one subsequent set of eye images. In one particular example, each set of images may include images taken by respective first and second image capture devices, such as represented in FIG. 1. In such example, two wide angle cameras with structured lighting may be used to provide an overlapping field of view. In one embodiment, the cameras may have LEDs mounted at the center of each of their lenses. These LEDs create the glint and the glowing pupil, called the bright eye effect. In the case where a smaller focal length lens needs to be used to create an even wider overlapping field of view (for example when a large screen for display is being used), a ring of LEDs around the camera lens may be used to generate the bright eye effect. This may be preferred with a small focal length, because an LED at the center of the lens can sometimes obscure the camera image and decrease the effective aperture of the lens, thus diminishing image quality. The resulting camera images obtained in step 1700 may be considered zoomed out views of the camera images generated by the Hutchinson et al. '563 patent, with each image containing a wider field of view with two eyes seen in each image. In still further embodiments, it should be appreciated that the dark eye imaging techniques discussed herein also may be used to obtain the desired glint and pupil information desired herein.

When two image capture devices are used to obtain a set of images, a synchronization or locking process may be implemented to coordinate timing of illumination of light sources associated with such image capture devices and as well as timing of camera operation. For example, two cameras may be synchronized such that when one camera begins to integrate its charge coupled device (CCD) array, meaning it begins to capture the image, the light source for that camera is turned on while the light source for the other camera is turned off, and the other camera does not integrate. When the first camera finishes integration, its light source turns off, and the other camera turns its light source on and begins to integrate. This locking allows each camera to see a bright eye effect without having its camera image impacted by the other camera's light source. An alternate locking process may be used allowing each camera to see a dark eye effect (e.g., by having the first camera integrate only while a light source associated with the second camera is turned on and having the second camera integrate only while a light source associated with the first camera is turned on.) Such locking protocols may be accomplished by sending clocking signals outputted from one camera into the LED arrays and the trigger inputs on the second camera.

Referring still to FIG. 17, a second step 1702 in such method comprises determining a scaling factor for each subsequent set of images obtained as the eye tracking process continues. In general, the scaling factor for each subsequent set of images is determined by the spatial difference in eye features (e.g., glint and pupil features) between that subsequent set of images divided by the spatial difference in eye features from a previous set of images (either the initial set of images or another previous set of images for which calibration equations are automatically generated).

In step 1704, ocular characteristics of a user's eyes then optionally may be obtained. Certain ocular characteristics are obtained in order to adjust the image data obtained by an eye tracking system so that the data applied to a calibration model is as accurate as possible. In one example, such ocular characteristics may be determined ahead of time and entered into an eye tracking system as predetermined data. In another example, such ocular characteristics are measured by the subject system. Measurements may be initiated by the system, by a user looking at a camera or other feature or taking some other user-initiated action, or in an automated manner that does not require any user intervention.

Using just a generalized spherical model of the eye can sometimes cause inaccurate gaze estimate. Such a model uses assumed values for characteristics of a user's eye, such as foveal displacement and radius of curvature. As such, the model can be further enhanced by correcting for the actual optical characteristics of the user's eye. Traditional calibration methods, where the user looks at a series of points, are implicitly measuring these characteristics and compensating for the 3D position of the user. In the presently disclosed technology, a user's ocular characteristics are measured without the need for the user to look at a series of calibration points in order to provide a calibration free eye-tracking system. This type of system is beneficial because some users, such as those with profound disabilities, cannot keep their focus on a series of points that move during calibration. Additionally, some users face cognitive challenges where teaching them to look at the points is time consuming and frequently impossible yet communication would still be possible for them if they did not have to complete calibration.

A first exemplary ocular characteristic to measure in step 1704 is the foveal displacement vector, a measure of how much the fovea deviates from the optical axis of the eye. The fovea is the region of the eye that has a high density of photoreceptors. It is the part of the eye that "sees" where you are looking at to a high degree of clarity, as opposed to the peripheral region, which has fewer photoreceptors. The fovea subtends for about one degree visual angle from the eye; this creates the fundamental accuracy limitation in eye-trackers mentioned earlier. If you know exactly where the eye is pointed, you only know within one degree visual angle, or a few millimeters at a normal viewing distance, what the person is actually seeing. The fovea is a biological mechanism; as such, it is not perfectly aligned with someone's optical axis. By making a measurement of the foveal displacement vector, the inputs into the generalized equations for the spherical model of the eye can be corrected. In essence, the foveal displacement vector is subtracted from all subsequent glint-pupil vector measurements and this modified vector value is ultimately fed into the calibration equations or generalized spherical model of the eye, for example, as described in the Hutchinson et al. '563 patent. The foveal displacement vector may also be modified by the scaling factor determined in step 1702 based on the distance change of the eye from its initial position of measurement prior to subtracting it from the scaled glint-pupil vector.

Numerous examples as may be known by one of ordinary skill in the art may be used for measuring the foveal displacement of a user's eyes. Under the generalized spherical model of the eye, the glint rests at the pupil center when the eye looks back at the camera. To measure the foveal displacement vector, the system may simply measure the glint-pupil center separation when the user looks back at the camera. This is accomplished by making the user look at the camera while holding his/her gaze steady to enable pointer control with his or her eyes. To detect this, the system analyzes the resulting camera images that occur when the glint-pupil center approaches convergence and holds steady for a specified amount of time.

A next exemplary ocular characteristic that may be measured in step 1704 is the radius of curvature for the cornea. The assumed value for all humans used in the generalized spherical model can result in inaccurate measurements of spherical rotation. To measure radius of curvature, the cameras, whose light sources are generally in sync with the integration of their actual CCDs, now light up out of sync. This means the LED(s) for the camera that is turned off are now on when the other camera is integrating, and the LED(s) for the camera that is integrating are turned off. This creates a very different camera image, one where the pupil is dark and the face is bright, as opposed to having the pupil bright and the face dark. This is called the Dark Eye effect. Note that this Dark Eye effect could also be generated by having a bank of LEDs mounted between the cameras and turning these LEDs on and the LEDs mounted at the center of the camera lens or around the camera lens off. The timing on how the LEDs flash can be controlled through the SDK provided by a camera manufacturer.

Figure 15:
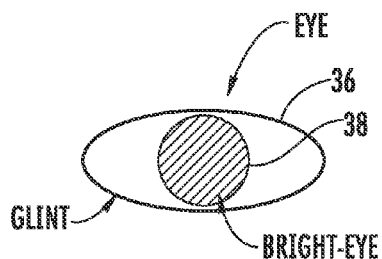
FIG. 15 depicts a prior art representation of a user's eye characterized by a bright-eye effect during illumination.

Referring still further to FIG. 17, a next step 1706 in the subject method of providing auto-calibration features is to obtain glint and pupil information for one or more eyes from each set of images. Glint and pupil information may comprise separate data defining the respectively determined locations of the glint and pupil. Alternatively, glint and pupil information may comprise a vector or other parameter(s) defining the glint and pupil relative to one another (e.g., a glint-pupil vector defining the distance between the pupil and glint centers.) As previously mentioned, the glint and pupil information needed for gaze location determination can be obtained from either bright-eye or dark-eye images. One example of glint and pupil identification is represented in FIG. 15 and described further in the Hutchinson et al. '563 patent, while others are known in the art. The glint and pupil information is what is needed as input to the equations defining a calibration model. As such, the glint and pupil data is also modified in step 1706 as needed according to the scaling constant. In other words, each glint and pupil measurement provided as input for a subsequent image is modified according to the scaling factor determined in step 1702 that defines where the user is looking relative to some initial or previous location.

As part of gathering glint and pupil information for one or more eyes in an image or set of images, all or part of an image may be analyzed to detect/identify eyes within the image(s). Numerous eye identification algorithms exist, and the algorithms described in the Hutchinson et al. '563 patent can be used to find the eye in one image. Executing the algorithms multiple times on a single image allows all potential eyes to be found in an image. If the task of finding eyes in an image is applied to a set of images (e.g., images obtained by respective first and second cameras), an eye identification algorithm can be implemented for the second camera's image as well as a first camera's image in the set of images.

After finding all eyes, embodiments of the disclosed technology may then pick the appropriate pair of eyes in each image by finding a pair in the first image that closely aligns with a pair in the second image in regards to size of the pupil and alignment (meaning distance and separation between the eyes). Because the dual-camera system has cameras with overlapping fields of view, the valid eyes will look approximately the same in each image. Misidentifications in one image can be eliminated because they will not appear in the second image. In other words, the orientation of the eyes in one image would not match the orientation in the second image if the wrong features are found.

Once glint and pupil information (modified as needed) is obtained in step 1706, a final step 1708 involves applying the glint and pupil information to a calibration model to determine a sequence of equations for mapping glint and pupil data to a display. The calibration model to which the modified glint-pupil information is inputted may correspond to the generalized spherical model of the eye which may or may not be corrected by accounting for the ocular characteristics (e.g., foveal displacement and corneal curvature) measured in step 1704. The modified glint-pupil information from step 1706 is then provided as input to the corrected calibration model and an accurate point of regard is calculated. Each eye's gaze direction may be calculated independently once the input data is corrected, and the results may be averaged to determine a single point of regard. In addition, smoothing routines may be optionally applied to data at any point before or after the mapping in step 1708.

Image Capture Mode:

Many known eye tracking systems and methods, including those described in the Hutchinson et al. '563 patent, utilize a so-called "bright-eye" approach for obtaining pupil information from an image. In general, the bright eye approach typically involves obtaining an image of one or more eyes of a user while the user's eyes are illuminated by a light source that is substantially coaxially aligned with the lens of a video camera or other image capture device. This optical arrangement preferably yields an operant image consisting of an iris and sclera (both dark), the reemission of the infrared light out of the pupil (bright eye), and the corneal reflection of the infrared light source (glint). An in-focus bright eye image gives a high contrast boundary at the pupil perimeter making it easily distinguishable.

Although the bright-eye or bright-pupil mode of image capture and subsequent image processing may generally provide a suitable image for eye tracking purposes, dark-eye effects may also be used. Whether to use bright-eye techniques or dark-eye techniques have often been a matter of design preference depending on such factors as hardware design constraints, lighting conditions, user's eye color, etc. Conventional eye tracking devices often used only one mode or the other (either bright-eye or dark-eye) to capture eye images for processing and tracking purposes.

In light of the prior all-or-nothing approach of image capture in eye tracking systems, one improved feature of the presently disclosed technology is to provide a system and method that includes both bright-eye and dark-eye image capture modes as well as features for dynamically determining which mode to use based on certain parameters. Aspects of this feature are illustrated in FIGS. 18-20.

Figure 18:
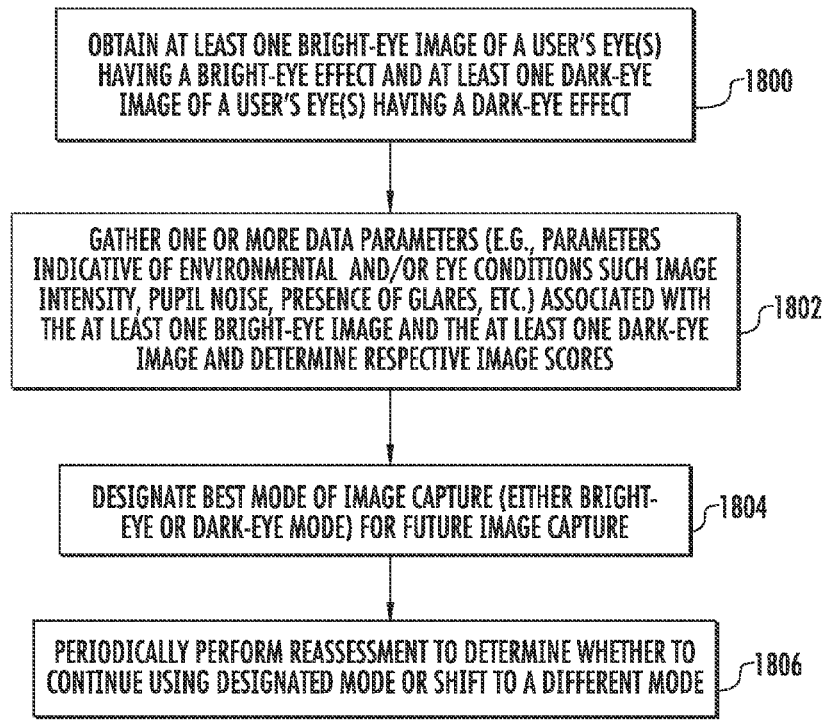
FIG. 18 provides a flow chart of steps in an exemplary method of optimizing the image capture mode for an eye tracking device.

Referring now to FIG. 18, a first exemplary step 1800 in a method of optimizing the image capture mode (e.g., bright-eye mode or dark-eye mode) for an eye tracking device involves obtaining at least one image of a user's eye(s) containing a bright-eye effect and obtaining at least one image of a user's eye(s) containing a dark-eye effect.

Figure 19:
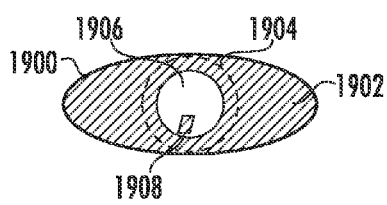
FIG. 19 depicts an exemplary schematic representation of a captured image of a user's eye having a bright-eye effect in accordance with optimizing an image capture mode.

As shown in FIG. 19, an eye image 1900 having a bright-eye effect generally corresponds to an image where the iris 1902 and sclera 1904 are both dark, leaving the pupil 1906 as a bright portion in the image (similar to red-eye effects produced by some cameras). The glint, or brightest corneal reflection, 1908 (as well as optional additional Purkinje reflections) is also visible in the bright-eye image 1900. A bright eye image may be obtained by each image capture device in one or more ways. In one embodiment, a conventional approach of providing a light source in substantially coaxial optical alignment with the lens of an image capture device achieves bright-eye images. In another embodiment, a light source could be provided around the image capture device (e.g., a ring of LEDs surrounding the periphery of the image capture device lens).

Figure 20:
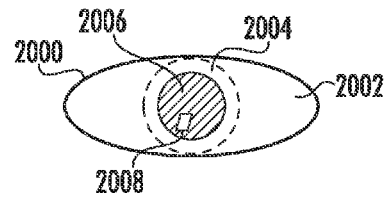
FIG. 20 depicts an exemplary schematic representation of a captured image of a user's eye having a dark-eye effect in accordance with optimizing an image capture mode.

As shown in FIG. 20, an eye image 2000 having a dark-eye effect generally corresponds to an image where the iris 2002 and sclera 2004 are both bright, leaving the pupil 2006 as a dark portion in the image. The glint 2008 (as well as optional additional Purkinje reflections) should also be visible in the dark-eye image 2000. A dark eye image may be obtained by each image capture device in one or more ways such that an image capture device obtains an image while a user's eye(s) are illuminated by a light source that is not substantially coaxially aligned with the operative image capture device. In one embodiment, where two or more image capture devices have substantially coaxially aligned light sources, each image capture device may be coordinated to operate by using the other image capture device's light source. For example, a first image capture device may obtain images while the second light source illuminates a user's eyes. Likewise, a second image capture device may obtain images while the first light source illuminates a user's eyes. This way, the same light sources and image capture devices can be used in a different fashion to implement both bright-eye and dark-eye effects in the same eye tracking device. In another embodiment, the dark-eye effect could be generated by having a bank of LEDs mounted between the at least two image capture devices and turning these LEDs on and the LEDs mounted at the center of the camera lens or around the camera lens off. In a still further embodiment, the LEDs may not be located between two cameras, but are instead off to either the left, right or both sides of the one or more cameras. The timing on how the variously configured LEDs or other suitable light sources flash can be controlled through the SDK provided by a camera manufacturer.

Once bright-eye and dark-eye images are obtained in step 1800, a user may then gather various data parameters associated with such images in order to make the determination in step 1804 of whether to choose bright-eye versus dark-eye modes for future image capture. In general, the goal behind the parameter analysis and determination is to choose the method that will give a user the most reliable determination of eye features going forward based on either environmental conditions, user eye conditions, or a combination of the two (as sometimes one impacts the other). In some embodiments, image scores may be obtained for each bright-eye image and dark-eye image that include one or more of the possible eye feature parameters in some weighted or preconfigured combination of such parameters in order to assess the best image mode.

It should be appreciated that in some embodiments of the disclosed methods of bright-eye versus dark-eye mode determination, it may also be desirable to invert either the bright-eye image or the dark-eye image so that the same techniques can be used to analyze and compare the different images. For example, inverting one of the two images provides a benefit of using the same eye feature finding algorithm to detect such eye features as the glint or pupil in an analyzed image.

One parameter that may be identified in step 1802 is the average image intensity. Determining a best image capture mode based solely or in part by analyzing image intensity is an advantageous implementation because analysis has shown that dark eye images are typically better for obtaining eye tracking image data if an image is very bright. Image intensity levels may be calculated for some or all pixels or areas in an image and may be calculated in accordance with one or more image intensity algorithms as known by one of ordinary skill in the art. For example, known methods of calculating image brightness, luminescence, and/or luma and the like may be used. Additionally or alternatively, one or more pixels may be analyzed by determining a weighted summation of its component intensities (e.g., red, green and blue component contributions to a pixel(s) or cyan, magenta, yellow and black component contributions to a pixel(s).) Instead of overall image intensity, it should also be appreciated that intensity levels for one or more parts of the image may also be used instead or as part of the image intensity determination. For example, pupil intensity and/or glint intensity may be gathered.

Another parameter than may be identified in step 1802 is the pupil noise. In one embodiment, pupil noise may be determined after other image analysis is done. Systems that analyze pupil noise levels in designating an image capture mode thus optimize their tracking technology based on a variety of factors, including the environment and physiological properties of the subject's eyes. The Hutchinson et al. '563 patent mentions an algorithm for smoothing pupil noise to assist with refining the eye tracking process. In the present technology, pupil noise may additionally be analyzed to determine a pupil noise score. Such pupil noise score may be calculated by determining which, if any, pixel locations have image characteristics that are outside of one or more predetermined threshold levels. Such pupil noise score then may be used to help determine whether a bright-eye image or a dark-eye image results in a higher quality image (thus meaning the image has a lower pupil noise score). Whichever image has a lower pupil noise score and corresponding better image quality will be considered in designating the best image capture mode.

A still further exemplary image data parameter that may be gathered in step 1802 is an image glare score. In particular, the at least one bright-eye image and at least one dark-eye image obtained in step 1800 may be analyzed to determine the number of, size of, density of, or area of an image covered by glares. Glares typically correspond to high intensity artifacts in an image such as may be caused by the presence of a user's eyeglasses. A glare generally has the same or higher intensity than a glint, but the glare is larger. Glare identification typically may be done before any attempt at glint or pupil identification is made. In one example, glares may be found by scanning an image in vertical and/or horizontal directions for pixels having a higher image intensity than some given threshold value. Groups of higher image intensity pixels are then identified and the areas of such groups are analyzed to determine which groups are large enough to likely correspond to glares.

The number, size, area, density, etc. related to the identified glares can then be analyzed. In some known systems, glares are detected in order to remove them from an image before subsequent image processing. In the subject system, glare identification is also used to help determine a glare score for choosing the best image capture mode.

Referring still to FIG. 18, after one or more image data parameters are gathered in step 1802, a best mode of image capture is designated in step 1804 as either the bright-eye image capture mode or the dark-eye image capture mode. After such designation, either the bright-eye mode or the dark-eye mode is then used for subsequent image capture in the eye tracking process. In one embodiment, the mode designated in step 1804 is used until a user's eyes are lost and the tracking system is required to perform a new auto-calibration process. In another embodiment, the subject system is configured to periodically perform the assessment set forth in steps 1800-1804 so that the system can continually determine which mode is best. In such example, an additional step 1806 thus involves periodically determining whether to continue using the mode designated in step 1804 or to shift to a different mode based on changes to the gathered data parameters in step 1802.

Advantages:

The above described embodiments and others as will be appreciated by one of ordinary skill in the art based on the present disclosure provide a number of advantages for potential users. For example, aspects of the disclosed technology bestow a level of independence previously unknown or lost to those individuals with a wide range of disabilities by providing them with a system that accurately measures where they are looking in a motion tolerant, calibration free manner and uses that information as input into a computer based system, such as a desktop computer, laptop computer, or cell phone. Such a device could also prove beneficial in other areas, including psychological research, marketing research, gaining, or medical diagnostics. This system could be used to measure where people look in cockpits, while driving, while performing surgery, in arcade games, on television screens, movie screens, or any other environment where measuring a person's direction of gaze can provide additional value.

Additionally, when interacting with any piece of technology, the user is typically presented with a series of available actions he or she can perform. Alternatively, a user implicitly knows what he or she can do based on the state of the technology. It is not always immediately obvious what commands, choices, or text should or could be entered into the software application or operating system a user is working with. Another purpose of the disclosed technology is to alleviate or at the very least reduce this ambiguity, granting the user faster and more reliable data entry and access to the technology. This is accomplished through the development of contextually aware selection and data input technology.

This aspect of the invention is especially, important for those with the disabilities described above. Individuals with disabilities who employ alternative access technology, such as the eye-tracking system disclosed here, head pointing mice, scanning technology, or voice activated technology typically have great difficulty using this technology to access a computer or to communicate because, due to the nature of their disease or injury, they are unable to make reliable selections with their access technology. By reducing the available command choices based upon the context in which the user is operating, such as the task they are performing, individuals with disabilities gain far more reliable and faster control over their technology. Indeed, this invention is important in any environment where the ability to accurately select commands is hampered, such as when the user may be distracted by performing other tasks or is even just moving (such as walking and trying to access their cell phone).

Many of the concepts described herein may variously lead to faster and more reliable selection and text entry in a computer system for individuals with disabilities, particularly those using the disclosed eye-tracking system. These concepts may be easily generalized to apply to cell phones, touch screens, cash registers, or any other type of technology, particularly technology that is used by distracted or multitasking individuals where contextually aware selection choices can improve reliability and task completion speed. Additionally, the eye-tracking system may be used in any many other different markets and environments, including psychological research, market research, medical diagnostics, gaming, or any other market where knowing point of gaze data can prove beneficial.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing automatic motion-tolerant calibration for an eye tracking device, comprising:

obtaining, by one or more computing devices, an initial set of eye images and at least one subsequent set of eye images;

determining, by the one or more computing devices, a scaling factor for each subsequent set of images defined by the spatial differences between eye features in each subsequent set of images divided by the spatial difference between eye features in the initial set of eye images or another previously obtained set of eye images;

obtaining, by the one or more computing devices, glint and pupil information from selected sets of images;

modifying, by the one or more computing devices, the obtained lint and pupil information from selected sets of images based on the determined scaling factor; and applying, by the one or more computing devices, the glint and pupil information from selected sets of images as modified by the appropriate scaling factor for the selected sets of images to a calibration model to determine a sequence of equations for mapping future gaze locations.

2. The method of claim 1, wherein obtaining a set of eye images comprises obtaining first and second images using alternating integration of first and second respective image capture devices and alternating illumination of first and second respective light sources.

3. The method of claim 1, further comprising an initial step of continuously running an eye identification algorithm to detect eyes such that said step of obtaining an initial set of images occurs immediately once the user appears in view of the eye tracking device.

4. The method of claim 1, wherein obtaining a set of images comprises obtaining a pupil image characterized by a bright eye effect.

5. The method of claim 1, wherein obtaining a set of images comprises obtaining a pupil image characterized by a dark eye effect.

6. The method of claim 1, further comprising a step of obtaining ocular characteristics of a user's eyes and correcting the calibration model based on the obtained ocular characteristics.

7. The method of claim 6, wherein obtaining ocular characteristics of a user's eyes comprises storing said ocular characteristics as predetermined input data.

8. The method of claim 6, wherein obtaining ocular characteristics of a user's eyes comprises automatically measuring ocular characteristics of a user's eyes in a manner that does not require user intervention.

9. The method of claim 6, wherein said ocular characteristics comprise one or more of foveal displacement and curvature of the cornea.

10. The method of claim 6, wherein obtaining ocular characteristics of a user's eyes and correcting the calibration model based on the obtained ocular characteristics comprises:
  obtaining, by the one or more computing devices, measurement of a foveal displacement vector;
  modifying, by the one or more computing devices, the foveal displacement vector by the scaling factor; and
  subtracting, by the one or more computing devices, the foveal displacement vector modified by the scaling factor from a glint-pupil vector determined from the glint and pupil information from selected sets of images, the glint-pupil vector also being modified by the scaling factor.

11. The method of claim 1, wherein determining, by the one or more computing devices, a scaling factor for each subsequent set of images defined by the spatial difference between eye features in each subsequent set of images divided by the spatial difference between eye features in the initial set of eye images or another previously obtained set of eye images comprises determining, by the one or more computing devices, a scaling factor for each subsequent set of images defined by the spatial differences between glint and pupil features in each subsequent set of images divided by the spatial differences between glint and pupil features in the initial set of images or another previously obtained set of eye images.

12. The method of claim 1, wherein applying, by the one or more computing devices, the glint and pupil information from selected sets of images and the appropriate scaling factor for the selected sets of images to a calibration model to determine a sequence of equations for mapping future gaze locations comprises applying, by the one or more computing devices, the glint and pupil information from selected sets of images and the appropriate scaling factor for the selected sets of images to a calibration model to determine a sequence of equations for mapping glint and pupil data for future images to a display.

* * * * *